(12) United States Patent
Kim

(10) Patent No.: US 11,017,319 B1
(45) Date of Patent: May 25, 2021

(54) METHOD FOR TRAINING OBFUSCATION NETWORK WHICH CONCEALS ORIGINAL DATA TO BE USED FOR MACHINE LEARNING AND TRAINING SURROGATE NETWORK WHICH USES OBFUSCATED DATA GENERATED BY OBFUSCATION NETWORK AND METHOD FOR TESTING TRAINED OBFUSCATION NETWORK AND LEARNING DEVICE AND TESTING DEVICE USING THE SAME

(71) Applicant: Deeping Source Inc., Seoul (KR)

(72) Inventor: Tae Hoon Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

(21) Appl. No.: 16/910,021

(22) Filed: Jun. 23, 2020

(51) Int. Cl.
   *G06N 20/00* (2019.01)
   *G06F 21/62* (2013.01)
   *G06N 3/08* (2006.01)

(52) U.S. Cl.
   CPC ......... *G06N 20/00* (2019.01); *G06F 21/6254* (2013.01); *G06N 3/08* (2013.01)

(58) Field of Classification Search
   None
   See application file for complete search history.

(56) References Cited

U.S. PATENT DOCUMENTS

| | | | |
|---|---|---|---|
| 2018/0005626 A1* | 1/2018 | Betley | G10L 15/02 |
| 2019/0095629 A1* | 3/2019 | Lee | G06N 3/04 |
| 2019/0188830 A1* | 6/2019 | Edwards | G06N 3/088 |

OTHER PUBLICATIONS

Katzir, Z. et al. (Jul. 2019). "Detecting adversarial perturbations through spatial behavior in activation spaces." 2019 International Joint Conference on Neural Networks (IJCNN). IEEE, 2019. (Year: 2019).*
U.S. Appl. No. 16/911,106, filed Jun. 24, 2020 entitled "Method for Training Obfuscation Network Which Conceals Original Data to Be Used for Machine Learning and Training Surrogate Network Which Uses Obfuscated Data Generated by Obfuscation Network and Learning Device Using the Same and Method for Testing Trained Obfuscation Network and Testing Device Using the Same"; Inventor: Tae Hoon Kim.

* cited by examiner

*Primary Examiner* — Kamran Afshar
*Assistant Examiner* — Benjamin J Buss
(74) *Attorney, Agent, or Firm* — Bekiares Eliezer LLP

(57) ABSTRACT

A method for training an obfuscation network and a surrogate network is provided. The method includes steps of: a 1st learning device (a) inputting original data of a 1st party, corresponding thereto, into the obfuscation network to generate obfuscated data wherein the 1st party owns the original data or is an entity to whom the original data is delegated; (b) transmitting the obfuscated data and the ground truth to a 2nd learning device corresponding to a 2nd party, and instructing the 2nd learning device to (i) input the obfuscated data into the surrogate network to generate characteristic information, (ii) calculate 1st losses using the ground truth and one of the characteristic information and task specific outputs, and (iii) train the surrogate network minimizing the 1st losses, and transmit the 1st losses to the 1st learning device; and (c) training the obfuscation network minimizing the 1st losses and maximizing 2nd losses.

19 Claims, 7 Drawing Sheets
(1 of 7 Drawing Sheet(s) Filed in Color)

METHOD FOR TRAINING OBFUSCATION NETWORK WHICH CONCEALS ORIGINAL DATA TO BE USED FOR MACHINE LEARNING AND TRAINING SURROGATE NETWORK WHICH USES OBFUSCATED DATA GENERATED BY OBFUSCATION NETWORK AND METHOD FOR TESTING TRAINED OBFUSCATION NETWORK AND LEARNING DEVICE AND TESTING DEVICE USING THE SAME

FIELD OF THE DISCLOSURE

The present disclosure relates to a method for training an obfuscation network which conceals original data to be used for machine learning and training a surrogate network which uses obfuscated data generated by the obfuscation network and a learning device using the same, and a method for testing the trained obfuscation network which is trained to conceal the original data to be used for the machine learning and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as the big data in the sense that common software tools and computer systems cannot easily handle such a huge volume of data.

And, although such a big data may have no meaning by itself, it can be useful for generation of new data, judgment or prediction in various fields through machine learning on patterns and the like.

Recently, due to the strengthening of a personal information protection act, it is required to delete information, that can be used for identifying individuals, from the data or to acquire consent of the individuals in order to trade or share such a big data. However, it is not easy to check if any information that can be used for identifying the individuals is present in such a large amount of the big data, and it is impossible to obtain the consent of every individual. Therefore, various techniques for such purposes have emerged.

As an example of a related prior art, a technique is disclosed in Korean Patent Registration No. 1861520. According to this technique, a face-concealing method, e.g., a face-anonymizing method, is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, where the second image is generated to have a facial shape different from that of the facial region detected in the detection step.

However, according to conventional techniques as well as the technique described above, it is determined whether identification information such as faces, text, etc. is included in the data, and then a portion corresponding to the identification information is masked or blurred. As a result, a machine learning algorithm cannot utilize such data due to distortion of original data. Also, in some cases, the data may contain unexpected identification information which cannot be concealed, e.g., anonymized. In particular, a conventional security camera performs an anonymizing process by blurring every pixel changed between frames due to a target to be anonymized moving between the frames in a video image, and if the anonymizing process is performed in this manner, critical information such as facial expression of an anonymized face becomes different from information contained in an original video image, and also, personal identification information overlooked during face detection may remain on the original video image.

Accordingly, the applicant of the present disclosure proposes a method for generating obfuscated data by obfuscating the original data such that the obfuscated data is different from the original data, while a result of inputting the original data into a learning model and a result of inputting the obfuscated data into the learning model are same as or similar to each other.

SUMMARY OF THE DISCLOSURE

It is an object of the present disclosure to solve all the aforementioned problems.

It is another object of the present disclosure to perform concealment, i.e., anonymization, in a simple and accurate way, since processes of searching data for personal identification information are eliminated.

It is still another object of the present disclosure to protect privacy and security of original data by generating anonymized data through irreversibly obfuscating the original data.

It is still yet another object of the present disclosure to generate data recognized as similar or same by a computer, but recognized as different by a human.

It is still yet another object of the present disclosure to stimulate a big data trade market.

In order to accomplish the objects above, distinctive structures of the present disclosure are described as follows.

In accordance with one aspect of the present disclosure, there is provided a method of a 1st learning device for training an obfuscation network which conceals original data to be used for machine learning, and for allowing a 2nd learning device to train a surrogate network which uses obfuscated data generated by the obfuscation network, including steps of: (a) the 1st learning device performing or supporting another device to perform a process of inputting the original data of a 1st party into the obfuscation network, to thereby allow the obfuscation network to generate the obfuscated data by obfuscating the original data, wherein the 1st party corresponds to the 1st learning device and wherein the 1st party is a party who is determined as an owner of the original data and its corresponding ground truth or is an entity to whom the original data and its corresponding ground truth are delegated by the owner; (b) the 1st learning device performing or supporting another device to perform a process of allowing the obfuscated data and the ground truth to be transmitted to a 2nd learning device corresponding to a 2nd party wherein the 2nd party is a party who is determined as having an intention to train the surrogate network by using the original data and the ground truth of the 1st party, to thereby allow the 2nd learning device to (i) input the obfuscated data into the surrogate network, and thus instruct the surrogate network to generate characteristic information by applying at least one learning operation of the surrogate network to the obfuscated data, (ii) calculate one or more 1st losses by referring to the ground truth and at least one of the characteristic information and a task specific output created by using the characteristic information, (iii) train the surrogate network such that the 1st losses are minimized, and (iv) transmit the 1st losses to the 1st learning device; and (c) the 1st learning device, if the 1st losses are acquired from the 2nd learning device, performing or supporting another device to perform a process of training the obfuscation network such that the 1st losses are minimized and such that one or more 2nd losses calculated by referring to the original data and the obfuscated data are maximized.

As one example, the surrogate network includes a 1st surrogate network to an n-th surrogate network wherein n is an integer greater than 0, wherein, at the step of (b), the 1st learning device performs or supports another device to perform a process of allowing the obfuscated data and the ground truth to be transmitted to the 2nd learning device, to thereby allow the 2nd learning device to (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data, (ii) calculate (ii-1) one or more (1_1)-st losses by referring to the ground truth and at least one of the 1st characteristic information and a 1st task specific output created by using the 1st characteristic information to (ii-2) one or more (1_n)-th losses by referring to the ground truth and at least one of the n-th characteristic information and an n-th task specific output created by using the n-th characteristic information, (iii) train the 1st surrogate network to the n-th surrogate network respectively such that (iii-1) the (1_1)-st losses to the (1_n)-th losses are respectively minimized or (iii-2) at least one average loss, which is averaged over the (1_1)-st losses to the (1_n)-th losses, is minimized, and (iv) transmit to the 1st learning device (iv-1) at least part of the (1_1)-st losses to the (1_n)-th losses as the 1st losses or (iv-2) the average loss as the 1st losses, and wherein, at the step of (c), the 1st learning device performs or supports another device to perform one of (i) a process of training the obfuscation network such that at least part of the (1_1)-st losses to the (1_n)-th losses are minimized and such that the 2nd losses are maximized, and (ii) a process of training the obfuscation network such that the average loss is minimized and such that the 2nd losses are maximized.

As one example, the surrogate network includes a 1st surrogate network to an n-th surrogate network wherein n is an integer greater than 0, wherein, at the step of (a), the 1st learning device performs or supports another device to perform a process of inputting the original data into the obfuscation network, to thereby allow the obfuscation network to obfuscate the original data and thus to generate 1st obfuscated data, wherein, at the step of (b), the 1st learning device allows the 1st obfuscated data and the ground truth to be transmitted to the 2nd learning device, to thereby allow the 2nd learning device to (i) input the 1st obfuscated data into the 1st surrogate network, and thus instruct the 1st surrogate network to generate 1st characteristic information by applying at least one learning operation of the 1st surrogate network to the 1st obfuscated data, (ii) calculate one or more (1_1)-st losses by referring to the ground truth and at least one of the 1st characteristic information and a 1st task specific output created by using the 1st characteristic information, (iii) train the 1st surrogate network such that the (1_1)-st losses are minimized, and (iv) transmit the (1_1)-st losses to the 1st learning device, wherein, at the step of (c), the 1st learning device performs or supports another device to perform a process of training the obfuscation network such that the (1_1)-st losses are minimized and such that one or more (2_1)-st losses calculated by referring to the original data and the 1st obfuscated data are maximized, to thereby allow the obfuscation network to be a 1st trained obfuscation network, and wherein, while increasing an integer k from 2 to n, the 1st learning device performs or supports another device to perform (I) a process of inputting the original data into a (k−1)-th trained obfuscation network, to thereby allow the (k−1)-th trained obfuscation network to generate k-th obfuscated data by obfuscating the original data, (II) a process of allowing the k-th obfuscated data to be transmitted to the 2nd learning device, to thereby instruct the 2nd learning device to (i) input the k-th obfuscated data into a k-th surrogate network, and thus allow the k-th surrogate network to generate k-th characteristic information by applying the learning operation of the k-th surrogate network to the k-th obfuscated data, (ii) calculate one or more (1_k)-th losses by referring to the ground truth and at least one of the k-th characteristic information and a k-th task specific output created by using the k-th characteristic information, and (iii) train the k-th surrogate network such that the (1_k)-th losses are minimized, and transmit the (1_k)-th losses to the 1st learning device, and (III) a process of training the (k−1)-th trained obfuscation network such that the (1_k)-th losses are minimized and such that one or more (2_k)-th losses calculated by referring to the original data and the k-th obfuscated data are maximized, and thus allowing the (k−1)-th trained obfuscation network to be a k-th trained obfuscation network.

As one example, at the step of (c), on condition that one or more obfuscated data scores have been acquired as the 2nd losses wherein the obfuscated data scores correspond to the obfuscated data inputted into a discriminator capable of determining whether data inputted thereto is real or fake, the 1st learning device performs or supports another device to perform (i) a process of training the obfuscation network such that the 1st losses are minimized and such that the 2nd losses are maximized, and (ii) a process of training the discriminator such that one or more modified data scores or one or more modified obfuscated data scores, respectively corresponding to modified data or modified obfuscated data inputted into the discriminator, are maximized and such that the obfuscated data scores are minimized, wherein the modified data or the modified obfuscated data is generated by respectively modifying the original data or the obfuscated data.

As one example, the surrogate network includes a 1st surrogate network to an n-th surrogate network wherein n is an integer greater than 0, wherein, at the step of (b), the 1st learning device performs or supports another device to perform a process of allowing the obfuscated data and the ground truth to be transmitted to the 2nd learning device, to thereby allow the 2nd learning device to (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data, (ii) calculate (ii-1) one or more (1_1)-st losses by referring to the ground truth and at least one of the 1st characteristic information and a 1st task specific output created by using the 1st characteristic information to (ii-2) one or more (1_n)-th losses by referring to the ground truth and at least one of the n-th characteristic information and an n-th task specific output created by using the n-th characteristic information, (iii) train the 1st surrogate network to the n-th surrogate network respectively such that (iii-1) the (1_1)-st losses to the (1_n)-th losses are respectively minimized or (iii-2) at least one average loss, which is averaged over the (1_1)-st losses to the (1_n)-th losses, is minimized, and (iv) transmit to the 1st learning device (iv-1) at least part of the (1_1)-st losses to the (1_n)-th losses as the 1st losses or (iv-2) the average loss as the 1st losses, and wherein, at the step of (c), the 1st learning device performs or supports another device to perform (i) one of (i-1) a process of training the obfuscation network such that at least part of the (1_1)-st losses to the (1_n)-th losses are minimized and such that the 2nd losses, which are the obfuscated data scores corresponding to the obfuscated data inputted into the discriminator, are maximized, and (i-2) a process of training the obfuscation network such that the average loss is minimized and such that the 2nd losses are maximized, and (ii) a process of training the discriminator such that the modified data scores or the modified obfuscated data scores, respectively corresponding to the modified data or the modified obfuscated data inputted into the discriminator, are maximized, and such that the obfuscated data scores are minimized.

As one example, the surrogate network includes a 1st surrogate network to an n-th surrogate network wherein n is an integer greater than 0, wherein, at the step of (a), the 1st learning device performs or supports another device to perform a process of inputting the original data into the obfuscation network, to thereby allow the obfuscation network to obfuscate the original data and thus to generate 1st obfuscated data, wherein, at the step of (b), the 1st learning device allows the 1st obfuscated data and the ground truth to be transmitted to the 2nd learning device, to thereby allow the 2nd learning device to (i) input the 1st obfuscated data into the 1st surrogate network, and thus instruct the 1st surrogate network to generate 1st characteristic information by applying at least one learning operation of the 1st surrogate network to the 1st obfuscated data, (ii) calculate one or more (1_1)-st losses by referring to the ground truth and at least one of the 1st characteristic information and a 1st task specific output created by using the 1st characteristic information, (iii) train the 1st surrogate network such that the (1_1)-st losses are minimized, and (iv) transmit the (1_1)-st losses to the 1st learning device, wherein, at the step of (c), the 1st learning device performs or supports another device to perform (i) a process of training the obfuscation network such that the (1_1)-st losses are minimized and such that one or more (2_1)-st losses, which are one or more 1st obfuscated data scores corresponding to the 1st obfuscated data inputted into the discriminator, are maximized, to thereby allow the obfuscation network to be a 1st trained obfuscation network, and (ii) a process of training the discriminator such that one or more 1st modified data scores or one or more 1st modified obfuscated data scores, respectively corresponding to the modified data or 1st modified obfuscated data created by modifying the 1st obfuscated data, inputted into the discriminator are maximized and such that the 1st obfuscated data scores are minimized, to thereby allow the discriminator to be a 1st trained discriminator, and wherein, while increasing an integer k from 2 to n, the 1st learning device performs or supports another device to perform (I) a process of inputting the original data into a (k−1)-th trained obfuscation network, to thereby allow the (k−1)-th trained obfuscation network to generate k-th obfuscated data by obfuscating the original data, (II) a process of allowing the k-th obfuscated data to be transmitted to the 2nd learning device, to thereby allow the 2nd learning device to (i) input the k-th obfuscated data into a k-th surrogate network, and thus instruct the k-th surrogate network to generate k-th characteristic information by applying the learning operation of the k-th surrogate network to the k-th obfuscated data, (ii) calculate one or more (1_k)-th losses by referring to the ground truth and at least one of the k-th characteristic information and a k-th task specific output created via using the k-th characteristic information, and (iii) train the k-th surrogate network such that the (1_k)-th losses are minimized, and transmit the (1_k)-th losses to the 1st learning device, and (III) (III-1) a process of training the (k−1)-th trained obfuscation network such that the (1_k)-th losses are minimized and such that one or more (2_k)-th losses, which are one or more k-th obfuscated data scores corresponding to the k-th obfuscated data inputted into a (k−1)-th trained discriminator, data are maximized, and thus allowing the (k−1)-th trained obfuscation network to be a k-th trained obfuscation network, (III-2) a process of training the (k−1)-th trained discriminator such that one or more k-th modified data scores or one or more k-th modified obfuscated data scores, respectively corresponding to the modified data or k-th modified obfuscated data created by modifying the k-th obfuscated data inputted into the (k−1)-th trained discriminator and such that the k-th obfuscated data scores are minimized, to thereby allow the (k−1)-th trained discriminator to be a k-th trained discriminator.

As one example, a maximum of the modified data scores or the modified obfuscated data scores, respectively corresponding to the modified data or the modified obfuscated data inputted into the discriminator, is 1 as a value for determining the modified data or the modified obfuscated data as real, and a minimum of the obfuscated data scores, corresponding to the obfuscated data inputted into the discriminator, is 0 as a value for determining the obfuscated data as fake.

As one example, at the step of (c), the 1st learning device (i) measures at least one quality by referring to at least part of an entropy and a degree of noise of the obfuscated data, and (ii) trains the obfuscation network such that the 1st losses are minimized by further referring to the measured quality.

In accordance with another aspect of the present disclosure, there is provided a method for testing an obfuscation network, including steps of: (a) on condition that a 1st learning device has performed or supported another device to perform (i) a process of inputting original data for training of a 1st party into the obfuscation network, to thereby allow the obfuscation network to generate obfuscated data for training by obfuscating the original data for training, wherein the 1st party corresponds to the 1st learning device and wherein the 1st party is a party who is determined as an owner of the original data for training and its corresponding ground truth or is an entity to whom the original data for training and its corresponding ground truth are delegated by the owner, (ii) a process of allowing the obfuscated data for training and the ground truth to be transmitted to a 2nd learning device corresponding to a 2nd party wherein the 2nd party is a party who is determined as having an intention to train a surrogate network by using the original data for training and the ground truth of the 1st party, to thereby allow the 2nd learning device to (ii-1) input the obfuscated data for training into the surrogate network, and thus instruct the surrogate network to generate characteristic information for training by applying at least one learning operation of the surrogate network to the obfuscated data for training, (ii-2) calculate one or more 1st losses by referring to the ground truth and at least one of the characteristic information for training and a task specific output for training created by using the characteristic information for training, (ii-3) train the surrogate network such that the 1st losses are minimized, and (ii-4) transmit the 1st losses to the 1st learning device, and (iii) if the 1st losses are acquired from the 2nd learning device, a process of training the obfuscation network such that the 1st losses are minimized and such that one or more 2nd losses calculated by referring to the original data for training and the obfuscated data for training are maximized, a testing device performing or supporting another device to perform a process of acquiring original data for testing to be concealed; and (b) the testing device performing or supporting another device to perform a process of the original data for testing into the obfuscation network, to thereby allow the obfuscation network to generate obfuscated data for testing by obfuscating the original data for testing.

As one example, at the step of (a), on condition that one or more obfuscated data scores for training have been acquired as the 2nd losses wherein the obfuscated data scores for training correspond to the obfuscated data for training inputted into a discriminator capable of determining whether data inputted thereto is real or fake, the 1st learning device has completed or supported another device to complete (i) a process of training the obfuscation network such that the 1st losses are minimized and such that the 2nd losses are maximized, and (ii) a process of training the discriminator such that one or more modified data scores for training or one or more modified obfuscated data scores for training, respectively corresponding to modified data for training or modified obfuscated data for training inputted into the discriminator, are maximized and such that the obfuscated data scores are minimized, wherein the modified data for training or the modified obfuscated data for training is generated by respectively modifying the original data for training or the obfuscated data for training.

In accordance with still another aspect of the present disclosure, there is provided a 1st learning device for training an obfuscation network which conceals original data to be used for machine learning, and for allowing a 2nd learning device to train a surrogate network which uses obfuscated data generated by the obfuscation network, including: at least one memory that stores instructions; and at least one processor configured to execute the instructions to perform or support another device to perform: (I) a process of inputting the original data of a 1st party into the obfuscation network, to thereby allow the obfuscation network to generate the obfuscated data by obfuscating the original data, wherein the 1st party corresponds to the 1st learning device and wherein the 1st party is a party who is determined as an owner of the original data and its corresponding ground truth or is an entity to whom the original data and its corresponding ground truth are delegated by the owner, (II) a process of allowing the obfuscated data and the ground truth to be transmitted to the 2nd learning device corresponding to a 2nd party wherein the 2nd party is a party who is determined as having an intention to train the surrogate network by using the original data and the ground truth of the 1st party, to thereby allow the 2nd learning device to (i) input the obfuscated data into the surrogate network, and thus instruct the surrogate network to generate characteristic information by applying at least one learning operation of the surrogate network to the obfuscated data, (ii) calculate one or more 1st losses by referring to the ground truth and at least one of the characteristic information and a task specific output created by using the characteristic information, (iii) train the surrogate network such that the 1st losses are minimized, and (iv) transmit the 1st losses to the 1st learning device, and (III) if the 1st losses are acquired from the 2nd learning device, a process of training the obfuscation network such that the 1st losses are minimized and such that one or more 2nd losses calculated by referring to the original data and the obfuscated data are maximized.

As one example, the surrogate network includes a 1st surrogate network to an n-th surrogate network wherein n is an integer greater than 0, wherein, at the process of (II), the processor performs or supports another device to perform a process of allowing the obfuscated data and the ground truth to be transmitted to the 2nd learning device, to thereby allow the 2nd learning device to (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data, (ii) calculate (ii-1) one or more $(1\_1)$-st losses by referring to the ground truth and at least one of the 1st characteristic information and a 1st task specific output created by using the 1st characteristic information to (ii-2) one or more $(1\_n)$-th losses by referring to the ground truth and at least one of the n-th characteristic information and an n-th task specific output created by using the n-th characteristic information, (iii) train the 1st surrogate network to the n-th surrogate network respectively such that (iii-1) the $(1\_1)$-st losses to the $(1\_n)$-th losses are respectively minimized or (iii-2) at least one average loss, which is averaged over the $(1\_1)$-st losses to the $(1\_n)$-th losses, is minimized, and (iv) transmit to the 1st learning device (iv-1) at least part of the $(1\_1)$-st losses to the $(1\_n)$-th losses as the 1st losses or (iv-2) the average loss as the 1st losses, and wherein, at the process of (III), the processor performs or supports another device to perform one of (i) a process of training the obfuscation network such that at least part of the $(1\_1)$-st losses to the $(1\_n)$-th losses are minimized and such that the 2nd losses are maximized, and (ii) a process of training the obfuscation network such that the average loss is minimized and such that the 2nd losses are maximized.

As one example, the surrogate network includes a 1st surrogate network to an n-th surrogate network wherein n is an integer greater than 0, wherein, at the process of (I), the processor performs or supports another device to perform a process of inputting the original data into the obfuscation network, to thereby allow the obfuscation network to obfuscate the original data and thus to generate 1st obfuscated data, wherein, at the process of (II), the processor allows the 1st obfuscated data and the ground truth to be transmitted to the 2nd learning device, to thereby allow the 2nd learning device to (i) input the 1st obfuscated data into the 1st surrogate network, and thus instruct the 1st surrogate network to generate 1st characteristic information by applying at least one learning operation of the 1st surrogate network to the 1st obfuscated data, (ii) calculate one or more $(1\_1)$-st losses by referring to the ground truth and at least one of the 1st characteristic information and a 1st task specific output created by using the 1st characteristic information, (iii) train the 1st surrogate network such that the $(1\_1)$-st losses are minimized, and (iv) transmit the $(1\_1)$-st losses to the 1st learning device, wherein, at the process of (III), the processor performs or supports another device to perform a process of training the obfuscation network such that the (1_1)-st losses are minimized and such that one or more (2_1)-st losses calculated by referring to the original data and the 1st obfuscated data are maximized, to thereby allow the obfuscation network to be a 1st trained obfuscation network, and wherein, while increasing an integer k from 2 to n, the processor performs or supports another device to perform (I) a process of inputting the original data into a (k−1)-th trained obfuscation network, to thereby allow the (k−1)-th trained obfuscation network to generate k-th obfuscated data by obfuscating the original data, (II) a process of allowing the k-th obfuscated data to be transmitted to the 2nd learning device, to thereby instruct the 2nd learning device to (i) input the k-th obfuscated data into a k-th surrogate network, and thus allow the k-th surrogate network to generate k-th characteristic information by applying the learning operation of the k-th surrogate network to the k-th obfuscated data, (ii) calculate one or more (1_k)-th losses by referring to the ground truth and at least one of the k-th characteristic information and a k-th task specific output created by using the k-th characteristic information, and (iii) train the k-th surrogate network such that the (1_k)-th losses are minimized, and transmit the (1_k)-th losses to the 1st learning device, and (III) a process of training the (k−1)-th trained obfuscation network such that the (1_k)-th losses are minimized and such that one or more (2_k)-th losses calculated by referring to the original data and the k-th obfuscated data are maximized, and thus allowing the (k-1)-th trained obfuscation network to be a k-th trained obfuscation network.

As one example, at the process of (III), on condition that one or more obfuscated data scores have been acquired as the 2nd losses wherein the obfuscated data scores correspond to the obfuscated data inputted into a discriminator capable of determining whether data inputted thereto is real or fake, the processor performs or supports another device to perform (i) a process of training the obfuscation network such that the 1st losses are minimized and such that the 2nd losses are maximized, and (ii) a process of training the discriminator such that one or more modified data scores or one or more modified obfuscated data scores, respectively corresponding to modified data or modified obfuscated data inputted into the discriminator, are maximized and such that the obfuscated data scores are minimized, wherein the modified data or the modified obfuscated data is generated by respectively modifying the original data or the obfuscated data.

As one example, the surrogate network includes a 1st surrogate network to an n-th surrogate network wherein n is an integer greater than 0, wherein, at the process of (II), the processor performs or supports another device to perform a process of allowing the obfuscated data and the ground truth to be transmitted to the 2nd learning device, to thereby allow the 2nd learning device to (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data, (ii) calculate (ii-1) one or more (1_1)-st losses by referring to the ground truth and at least one of the 1st characteristic information and a 1st task specific output created by using the 1st characteristic information to (ii-2) one or more (1_n)-th losses by referring to the ground truth and at least one of the n-th characteristic information and an n-th task specific output created by using the n-th characteristic information, (iii) train the 1st surrogate network to the n-th surrogate network respectively such that (iii-1) the (1_1)-st losses to the (1_n)-th losses are respectively minimized or (iii-2) at least one average loss, which is averaged over the (1_1)-st losses to the (1_n)-th losses, is minimized, and (iv) transmit to the 1st learning device (iv-1) at least part of the (1_1)-st losses to the (1_n)-th losses as the 1st losses or (iv-2) the average loss as the 1st losses, and wherein, at the process of (III), the processor performs or supports another device to perform (i) one of (i-1) a process of training the obfuscation network such that at least part of the (1_1)-st losses to the (1_n)-th losses are minimized and such that the 2nd losses, which are the obfuscated data scores corresponding to the obfuscated data inputted into the discriminator, are maximized, and (i-2) a process of training the obfuscation network such that the average loss is minimized and such that the 2nd losses are maximized, and (ii) a process of training the discriminator such that the modified data scores or the modified obfuscated data scores, respectively corresponding to the modified data or the modified obfuscated data inputted into the discriminator, are maximized, and such that the obfuscated data scores are minimized.

As one example, the surrogate network includes a 1st surrogate network to an n-th surrogate network wherein n is an integer greater than 0, wherein, at the process of (I), the processor performs or supports another device to perform a process of inputting the original data into the obfuscation network, to thereby allow the obfuscation network to obfuscate the original data and thus to generate 1st obfuscated data, wherein, at the process of (II), the processor allows the 1st obfuscated data and the ground truth to be transmitted to the 2nd learning device, to thereby allow the 2nd learning device to (i) input the 1st obfuscated data into the 1st surrogate network, and thus instruct the 1st surrogate network to generate 1st characteristic information by applying at least one learning operation of the 1st surrogate network to the 1st obfuscated data, (ii) calculate one or more (1_1)-st losses by referring to the ground truth and at least one of the 1st characteristic information and a 1st task specific output created by using the 1st characteristic information, (iii) train the 1st surrogate network such that the (1_1)-st losses are minimized, and (iv) transmit the (1_1)-st losses to the 1st learning device, wherein, at the process of (III), the processor performs or supports another device to perform (i) a process of training the obfuscation network such that the (1_1)-st losses are minimized and such that one or more (2_1)-st losses, which are one or more 1st obfuscated data scores corresponding to the 1st obfuscated data inputted into the discriminator, are maximized, to thereby allow the obfuscation network to be a 1st trained obfuscation network, and (ii) a process of training the discriminator such that one or more 1st modified data scores or one or more 1st modified obfuscated data scores, respectively corresponding to the modified data or 1st modified obfuscated data created by modifying the 1st obfuscated data, inputted into the discriminator are maximized and such that the 1st obfuscated data scores are minimized, to thereby allow the discriminator to be a 1st trained discriminator, and wherein, while increasing an integer k from 2 to n, the processor performs or supports another device to perform (I) a process of inputting the original data into a (k−1)-th trained obfuscation network, to thereby allow the (k−1)-th trained obfuscation network to generate k-th obfuscated data by obfuscating the original data, (II) a process of allowing the k-th obfuscated data to be transmitted to the 2nd learning device, to thereby allow the 2nd learning device to (i) input the k-th obfuscated data into a k-th surrogate network, and thus instruct the k-th surrogate network to generate k-th characteristic information by applying the learning operation of the k-th surrogate network to the k-th obfuscated data, (ii) calculate one or more (1_k)-th losses by referring to the ground truth and at least one of the k-th characteristic information and a k-th task specific output created via using the k-th characteristic information, and (iii) train the k-th surrogate network such that the (1_k)-th losses are minimized, and transmit the (1_k)-th losses to the 1st learning device, and (III) (III-1) a process of training the (k−1)-th trained obfuscation network such that the (1_k)-th losses are minimized and such that one or more (2_k)-th losses, which are one or more k-th obfuscated data scores corresponding to the k-th obfuscated data inputted into a (k−1)-th trained discriminator, data are maximized, and thus allowing the (k−1)-th trained obfuscation network to be a k-th trained obfuscation network, (III-2) a process of training the (k−1)-th trained discriminator such that one or more k-th modified data scores or one or more k-th modified obfuscated data scores, respectively corresponding to the modified data or k-th modified obfuscated data created by modifying the k-th obfuscated data inputted into the (k−1)-th trained discriminator and such that the k-th obfuscated data scores are minimized, to thereby allow the (k−1)-th trained discriminator to be a k-th trained discriminator.

As one example, a maximum of the modified data scores or the modified obfuscated data scores, respectively corresponding to the modified data or the modified obfuscated data inputted into the discriminator, is 1 as a value for determining the modified data or the modified obfuscated data as real, and a minimum of the obfuscated data scores, corresponding to the obfuscated data inputted into the discriminator, is 0 as a value for determining the obfuscated data as fake.

As one example, at the process of (III), the processor (i) measures at least one quality by referring to at least part of an entropy and a degree of noise of the obfuscated data, and (ii) trains the obfuscation network such that the 1st losses are minimized by further referring to the measured quality.

In accordance with still yet another aspect of the present disclosure, there is provided a testing device for testing an obfuscation network, including: at least one memory that stores instructions; and at least one processor configured to execute the instructions to perform or support another device to perform: (I) on condition that a 1st learning device has performed or supported another device to perform (i) a process of inputting original data for training of a 1st party into the obfuscation network, to thereby allow the obfuscation network to generate obfuscated data for training by obfuscating the original data for training, wherein the 1st party corresponds to the 1st learning device and wherein the 1st party is a party who is determined as an owner of the original data for training and its corresponding ground truth or is an entity to whom the original data for training and its corresponding ground truth are delegated by the owner, (ii) a process of allowing the obfuscated data for training and the ground truth to be transmitted to the 2nd learning device corresponding to a 2nd party wherein the 2nd party is a party who is determined as having an intention to train a surrogate network by using the original data for training and the ground truth of the 1st party, to thereby allow the 2nd learning device to (ii-1) input the obfuscated data for training into the surrogate network, and thus instruct the surrogate network to generate characteristic information for training by applying at least one learning operation of the surrogate network to the obfuscated data for training, (ii-2) calculate one or more 1st losses by referring to the ground truth and at least one of the characteristic information for training and a task specific output for training created by using the characteristic information for training, (ii-3) train the surrogate network such that the 1st losses are minimized, and (ii-4) transmit the 1st losses to the 1st learning device, and (iii) if the 1st losses are acquired from the 2nd learning device, a process of training the obfuscation network such that the 1st losses are minimized and such that one or more 2nd losses calculated by referring to the original data for training and the obfuscated data for training are maximized, a process of acquiring original data for testing to be concealed, and (II) a process of the original data for testing into the obfuscation network, to thereby allow the obfuscation network to generate obfuscated data for testing by obfuscating the original data for testing.

As one example, at the process of (I), on condition that one or more obfuscated data scores for training have been acquired as the 2nd losses wherein the obfuscated data scores for training correspond to the obfuscated data for training inputted into a discriminator capable of determining whether data inputted thereto is real or fake, the 1st learning device has completed or supported another device to complete (i) a process of training the obfuscation network such that the 1st losses are minimized and such that the 2nd losses are maximized, and (ii) a process of training the discriminator such that one or more modified data scores for training or one or more modified obfuscated data scores for training, respectively corresponding to modified data for training or modified obfuscated data for training inputted into the discriminator, are maximized and such that the obfuscated data scores are minimized, wherein the modified data for training or the modified obfuscated data for training is generated by respectively modifying the original data for training or the obfuscated data for training.

In addition, recordable media that are readable by a computer for storing a computer program to execute the method of the present disclosure are further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
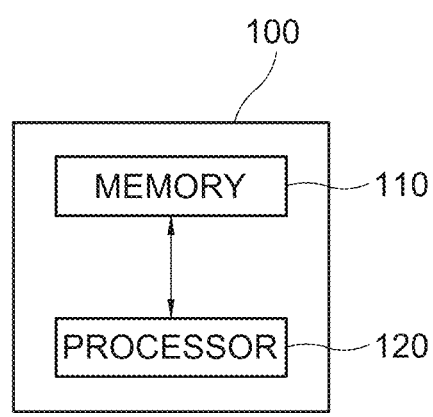
FIG. 1 is a drawing schematically illustrating a 1st learning device for training an obfuscation network which conceals, i.e., anonymizes, original data and for allowing a 2nd learning device to train a surrogate network which uses obfuscated data generated by the obfuscation network in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

For reference, throughout the present disclosure, the phrase "for training" or "training" is added for terms related to training processes, and the phrase "for testing" or "testing" is added for terms related to testing processes, to avoid possible confusion.

The headings and abstract of the present disclosure provided herein are for convenience only and do not limit or interpret the scope or meaning of the embodiments.

To allow those skilled in the art to carry out the present disclosure easily, the example embodiments of the present disclosure will be explained in detail as shown below by referring to attached drawings. The drawings may contain text or captions that may explain certain embodiments of the present disclosure. This text is included for illustrative, non-limiting, explanatory purposes of certain embodiments detailed in the present disclosure. Furthermore, the dashed lines contained in the drawings illustrate or otherwise represent an arbitrary image pattern.

FIG. 1 is a drawing schematically illustrating a 1st learning device for (i) training an obfuscation network which conceals, i.e., anonymizes, original data and (ii) allowing a 2nd learning device to train a surrogate network which uses obfuscated data generated by the obfuscation network in accordance with one example embodiment of the present disclosure.

By referring to FIG. 1, the 1st learning device 100 in accordance with one example embodiment of the present disclosure may include a memory 110 for storing instructions to train the obfuscation network for obfuscating the original data such that the surrogate network outputs a 1st result calculated by using the obfuscated data as an input, same or similar to a 2nd result calculated by using the original data as an input, and further storing instructions to interact with the 2nd learning device which trains the surrogate network by using the obfuscated data generated from the obfuscation network, and a processor 120 for performing processes to train the obfuscation network and interact with the 2nd learning device according to the instructions in the memory 110.

Specifically, the 1st learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, if the original data and its corresponding ground truth are acquired from a 1st party, the processor 120 may input the original data into the obfuscation network, to thereby allow the obfuscation network to obfuscate the original data and thus to generate the obfuscated data, according to the instructions stored in the memory 110. And the processor 120 may perform or support another device to perform a process of allowing the obfuscated data to be transmitted to the 2nd learning device corresponding to a 2nd party, to thereby instruct the 2nd learning device to (i) input the obfuscated data into the surrogate network, and thus instruct the surrogate network to generate characteristic information by applying at least one learning operation of the surrogate network to the obfuscated data, (ii) calculate one or more 1st losses by referring to (ii-1) the ground truth and (ii-2) at least one of the characteristic information and a task specific output created by using the characteristic information, (iii) train the surrogate network such that the 1st losses are minimized, and (iv) transmit the 1st losses to the 1st learning device 100. Thereafter, if the 1st losses are acquired from the 2nd learning device, the processor 120 may perform or support another device to perform a process of training the obfuscation network such that the 1st losses are minimized and such that one or more 2nd losses, calculated by referring to the original data and the obfuscated data, are maximized. Herein, the 1st party may correspond to the 1st learning device 100 and the 1st party may be a party who is determined as an owner of the original data and its corresponding ground truth or may be an entity to whom the original data and its corresponding ground truth are delegated by the owner, and the 2nd party may be a party who is determined as having an intention to train the surrogate network by using the original data and the ground truth of the 1st party.

Also, on condition that one or more obfuscated data scores have been acquired as the 2nd losses where the obfuscated data scores correspond to the obfuscated data inputted into a discriminator capable of determining whether data inputted thereto is real or fake, the processor 120 may perform or support another device to perform (i) a process of training the obfuscation network such that the 1st losses are minimized and such that the 2nd losses are maximized, and (ii) a process of training the discriminator such that one or more modified data scores or one or more modified obfuscated data scores, respectively corresponding to modified data or modified obfuscated data inputted into the discriminator, are maximized and such that the obfuscated data scores are minimized. Herein, the modified data or the modified obfuscated data may be generated by respectively modifying the original data or the obfuscated data.

And, the 2nd learning device may include a memory (not illustrated) for storing instructions to train the surrogate network by using the obfuscated data from the 1st learning device 100 and storing instructions to interact with the 1st learning device 100, and a processor (not illustrated) for performing processes to train the surrogate network and interact with the 1st learning device 100 according to the instructions in the memory.

Specifically, the 2nd learning device may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

A method of the 1st learning device 100 for training the obfuscation network which conceals, i.e., anonymizes, the original data to be used for machine learning, and for allowing the 2nd learning device to train the surrogate network which uses the obfuscated data generated from the obfuscation network, in accordance with one example embodiment of the present disclosure is described by referring to FIGS. 2 to 5 as follows.

Figure 2:
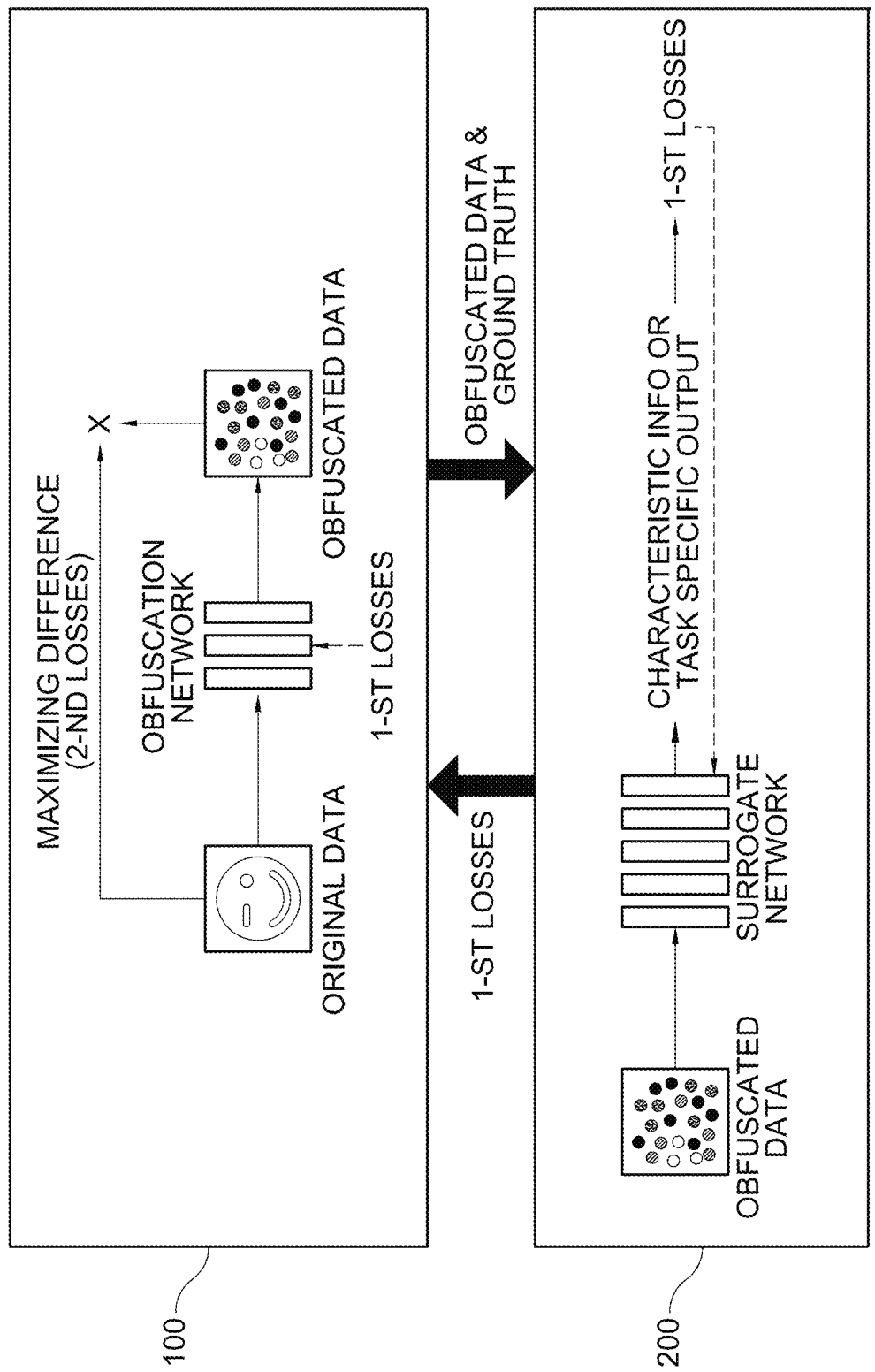
FIG. 2 is a drawing schematically illustrating a learning method for training the obfuscation network and for allowing the surrogate network to be trained in accordance with one example embodiment of the present disclosure.

FIG. 2 is a drawing schematically illustrating a learning method for training the obfuscation network which conceals, i.e., anonymizes, the original data and for allowing the surrogate network to be trained by using the obfuscated data in accordance with one example embodiment of the present disclosure.

First, if the original data and its corresponding ground truth of the 1st party are acquired, the 1st learning device 100 may input the original data into the obfuscation network, to thereby allow the obfuscation network to obfuscate the original data and thus to generate the obfuscated data.

Herein, the 1st party may be a party who is determined as an owner of the original data and its corresponding ground truth or may be an entity to whom the original data and its corresponding ground truth are delegated by the owner.

As another example, the 1st learning device 100 may input modified data, created by modifying the original data, into the obfuscation network, to thereby allow the obfuscation network to generate the obfuscated data, as the case may be. For example, the modified data may be generated by adding random noise created through a random noise generating network (not illustrated) to the original data. As one example, the random noise generating network may be instructed to generate the random noise having a normal distribution $N(0, \sigma)$, and the generated noise may be added to the original data, to thereby generate the modified data. Also, the modified data may be generated by blurring the original data, or changing a resolution of the original data, as well as using the random noise, but the scope of the present disclosure is not limited thereto, and various ways of modifying the original data may be used.

And, the obfuscated data may be recognized as different from the original data by humans, but may be recognized as similar to or same as the original data by the surrogate network.

Meanwhile, as one example, the obfuscation network may include at least one encoder having one or more convolutional layers for applying one or more convolution operations to the inputted original data X, and at least one decoder having one or more deconvolutional layers for applying one or more deconvolution operations to at least one feature map outputted from the encoder and thus for generating the obfuscated data, but the scope of the present disclosure is not limited thereto, and may include any learning networks having various structures capable of obfuscating the inputted original data.

Next, the 1st learning device 100 may allow the obfuscated data and the ground truth, corresponding to the original data, to be transmitted to the 2nd learning device 200 corresponding to the 2nd party.

Herein, the 2nd party may be a party who is determined as having an intention to train the surrogate network by using the original data and the ground truth of the 1st party.

Then, if the obfuscated data and the ground truth are acquired from the 1st learning device 100, the 2nd learning device may input the obfuscated data into the surrogate network, to thereby allow the surrogate network to apply the learning operation to the obfuscated data and thus to generate the characteristic information corresponding to the obfuscated data.

Herein, the surrogate network may include a machine learning network, but the scope of the present disclosure is not limited thereto, and may include any learning networks capable of generating the characteristic information by applying its learning operation to the inputted obfuscated data. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be concealed, e.g., a subject to be anonymized, may be personal information included in the original data. Herein, the personal information may include any information related to a person, such as personal identification information, personal medical information, personal biometric information, personal behavioral information, etc.

And, the characteristic information may be features corresponding to the original data. Also, the characteristic information may be feature values related to certain features in the original data, or the logits including values related to at least one of vectors, matrices, and coordinates related to the certain features. For example, if the original data are facial image data, the result above may be classes, facial features, e.g., laughing expressions, coordinates of facial landmark points, e.g., both end points on far sides of an eye, to be used for face recognition.

Thereafter, the 2nd learning device 200 may calculate the 1st losses by referring to (i) the ground truth and (ii) at least one of (ii-1) the characteristic information and (ii-2) a task specific output created by using the characteristic information.

Herein, the ground truth may be one of (i) referential characteristic information in the original data and (ii) a referential task specific output corresponding to the referential characteristic information. Also, the 1st losses may be calculated by referring to (i) the characteristic information and the referential characteristic information or (ii) the task specific output and the referential task specific output.

Also, the 2nd learning device 200 may calculate the 1st losses by referring to at least part of (i) difference between the characteristic information and its corresponding ground truth and (ii) at least one difference between the task specific output and its corresponding ground truth. As one example, the 2nd learning device 200 may calculate the 1st losses by referring to a norm or a cosine similarity between the characteristic information and its corresponding ground truth, i.e., the referential characteristic information, but the scope of the present disclosure is not limited thereto, and any various algorithms capable of calculating difference between the characteristic information and the referential characteristic information F(X) may be used.

Meanwhile, the task specific output may be an output of a task to be performed by the surrogate network, and may have various results according to the task by the surrogate network, such as a probability of a class for classification, coordinates resulting from regression for location detection, etc., and an activation function of an activation unit may be applied to the characteristic information outputted from the surrogate network, to thereby generate the task specific output according to the task to be performed by the surrogate network. Herein, the activation functions may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the surrogate network performs the task for the classification, the 2nd learning device 200 may map the characteristic information outputted from the surrogate network onto each of classes, to thereby generate one or more probabilities of the obfuscated data, for each of the classes. Herein, the probabilities for each of the classes may represent probabilities of the characteristic information, outputted for each of the classes from the surrogate network, being correct. For example, if the inputted data are the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the surrogate network onto each of the classes, but the scope of the present disclosure is not limited thereto, and various algorithms may be used for mapping the characteristic information onto each of the classes.

Next, the 2nd learning device 200 may train the surrogate network such that the 1st losses are minimized, and may transmit the 1st losses to the 1st learning device 100.

Herein, the surrogate network may be trained by using the 1st losses. That is, one or more parameters of the surrogate network may be updated via backpropagation using gradient descent, such that the surrogate network recognizes the obfuscated data as the original data.

Meanwhile, a process of training the surrogate network using the 1st losses and a process of transmitting the 1st losses to the 1st learning device 100 may occur in a different order and may occur independently of each other.

Next, if the 1st losses are acquired from the 2nd learning device 200, the 1st learning device 100 may perform or support another device to perform a process of training the obfuscation network such that the 1st losses are minimized and such that one or more 2nd losses, calculated by referring to the original data and the obfuscated data, are maximized.

That is, the 1st learning device 100 may train the obfuscation network, such that the obfuscation network generates the obfuscated data which is (i) different from the original data and (ii) recognized as the original data by the surrogate network.

Also, the 1st learning device 100 may measure at least one quality by referring to at least part of an entropy and a degree of noise of the obfuscated data, and may train the obfuscation network by using the 1st losses to which the measured quality is added. That is, the 1st learning device 100 may train the obfuscation network, such that the quality of the obfuscated data is minimized, for example, such that at least part of the entropy, the noise, etc. of the obfuscated data is maximized.

Supposing that processes of respectively training the obfuscation network and the surrogate network by using a same piece of the original data is a single iteration, then by repeating the iteration over a set of the original data, the obfuscation network which conceals, i.e., anonymizes, the original data to be used for machine learning and the surrogate network which uses the obfuscated data generated by the obfuscation network may be trained.

Figure 3:
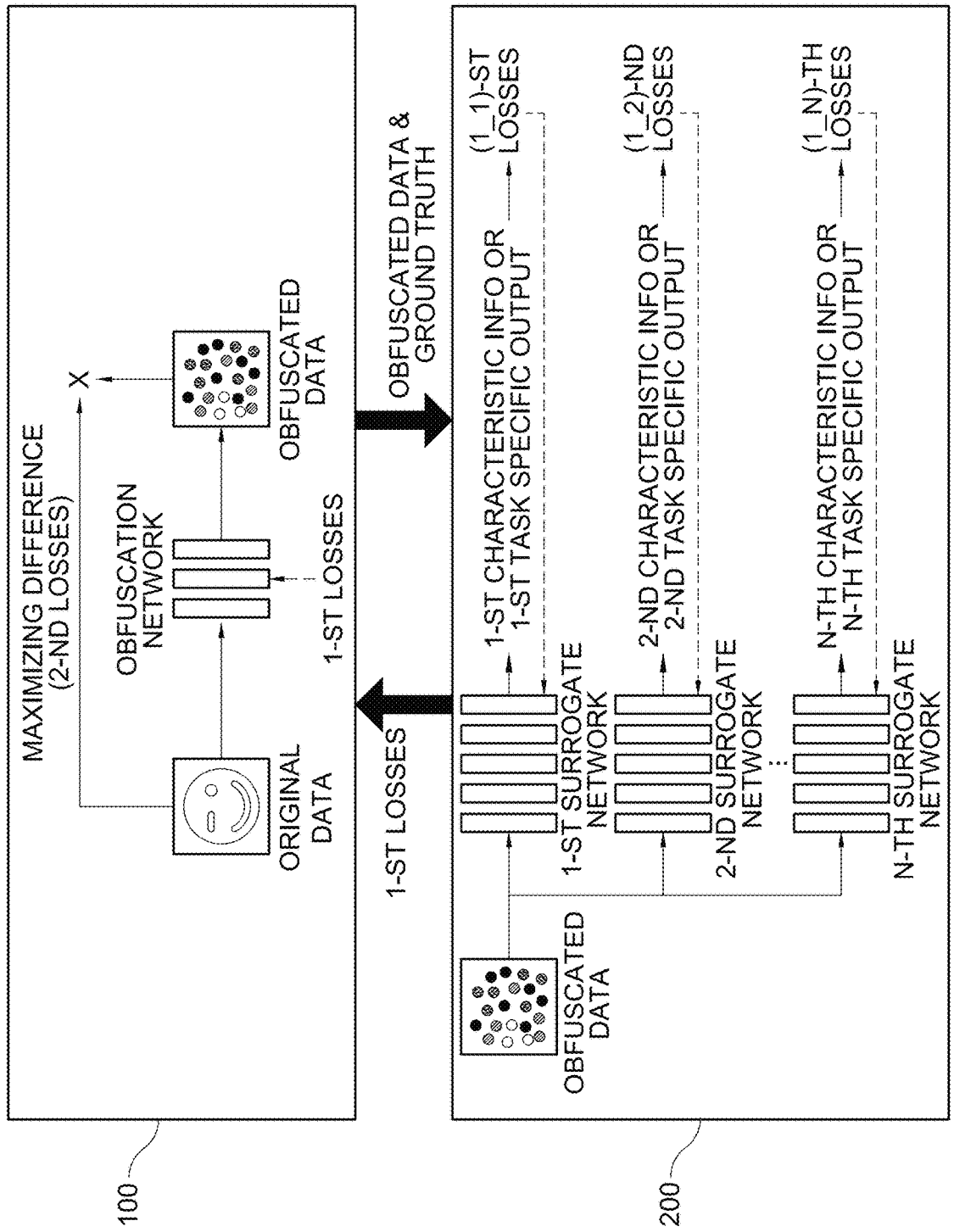
FIG. 3 is a drawing schematically illustrating another learning method for training the obfuscation network and for allowing surrogate networks which use the obfuscated data to be trained in accordance with one example embodiment of the present disclosure.

FIG. 3 is a drawing schematically illustrating another learning method for training the obfuscation network which conceals, i.e., anonymizes, the original data and allowing multiple surrogate networks to be trained by using the obfuscated data generated by the obfuscation network in accordance with one example embodiment of the present disclosure. Herein, the surrogate network as shown in FIG. 2 is configured as the multiple surrogate networks. Herein, each of the multiple surrogate networks may perform each of tasks different from one another. In the description below, the part easily deducible from the explanation of FIG. 2 will be omitted.

First, if the original data and its corresponding ground truth of the 1st party are acquired, the 1st learning device 100 may input the original data into the obfuscation network, to thereby allow the obfuscation network to obfuscate the original data and thus to generate the obfuscated data.

As another example, the 1st learning device 100 may input the modified data, created by modifying the original data, into the obfuscation network, to thereby allow the obfuscation network to generate the obfuscated data, as the case may be.

Next, the 1st learning device 100 may allow the obfuscated data and the ground truth, corresponding to the original data, to be transmitted to the 2nd learning device 200 corresponding to the 2nd party.

Then, if the obfuscated data and the ground truth are acquired from the 1st learning device 100, the 2nd learning device may input the obfuscated data respectively into a 1st surrogate network to an N-th surrogate network, to thereby allow the 1st surrogate network to the n-th surrogate network to respectively generate 1st characteristic information to n-th characteristic information by applying corresponding learning operation of the 1st surrogate network to the n-th surrogate network to the obfuscated data.

Thereafter, the 2nd learning device 200 may calculate (i) one or more (1_1)-st losses by referring to (i-1) the ground truth and (i-2) at least one of the 1st characteristic information and a 1st task specific output created by using the 1st characteristic information to (ii) one or more (1_n)-th losses by referring to (ii-1) the ground truth and (ii-2) at least one of the n-th characteristic information and an n-th task specific output created by using the n-th characteristic information.

Next, the 2nd learning device 200 may train the 1st surrogate network to the n-th surrogate network respectively such that (i) the (1_1)-st losses to the (1_n)-th losses are respectively minimized or (ii) at least one average loss, which is averaged over the (1_1)-st losses to the (1_n)-th losses, is minimized.

And, the 2nd learning device 200 may transmit to the 1st learning device 100 (i) at least part of the (1_1)-st losses to the (1_n)-th losses as the 1st losses or (ii) the average loss as the 1st losses.

Meanwhile, a process of training the 1st surrogate network to the n-th surrogate network by the 2nd learning device 200 and a process of transmitting the 1st losses from the 2nd learning device 200 to the 1st learning device 100 may occur in a different order and may occur independently of each other.

Next, if the 1st losses are acquired from the 2nd learning device 200, the 1st learning device 100 may perform or support another device to perform a process of training the obfuscation network such that the 1st losses are minimized and such that one or more 2nd losses, calculated by referring to the original data and the obfuscated data, are maximized.

That is, the 1st learning device 100 may perform or support another device to perform one of (i) a process of training the obfuscation network such that at least part of the (1_1)-st losses to the (1_n)-th losses acquired from the 2nd learning device 200 are minimized and such that the 2nd losses are maximized, and (ii) a process of training the obfuscation network such that the average loss acquired from the 2nd learning device 200 is minimized and such that the 2nd losses are maximized.

Also, the 1st learning device 100 may measure at least one quality by referring to at least part of an entropy and a degree of noise of the obfuscated data, and may train the obfuscation network by using the 1st losses to which the measured quality is added. That is, the 1st learning device 100 may train the obfuscation network, such that the quality of the obfuscated data is minimized, for example, such that at least part of the entropy, the noise, etc. of the obfuscated data is maximized.

Meanwhile, in the above, the 2nd learning device 200 is described as transmitting to the 1st learning device 100 (i) at least part of the (1_1)-st losses to the (1_n)-th losses as the 1st losses or (ii) the average loss as the 1st losses, and the 1st learning device 100 is described as training the obfuscation network by using the 1st losses and the 2nd losses, however, as another example, the 2nd learning device 200 may sequentially transmit each of the (1_1)-st losses to the (1_n)-th losses to the 1st learning device 100 as the 1st losses, to thereby allow the 1st learning device 100 to train the obfuscation network sequentially using each of the (1_1)-st losses to the (1_n)-th losses.

That is, the 1st learning device 100 may input the original data into the obfuscation network, to thereby allow the obfuscation network to obfuscate the original data and thus to generate 1st obfuscated data.

And, the 1st learning device 100 may allow the 1st obfuscated data and the ground truth to be transmitted to the 2nd learning device 200.

Then, the 2nd learning device 200 may input the 1st obfuscated data into the 1st surrogate network, to thereby allow the 1st surrogate network to generate the 1st characteristic information by applying the learning operation to the 1st obfuscated data, and may calculate the (1_1)-st losses by referring to (i) the ground truth and (ii) at least one of (ii-1) the 1st characteristic information and (ii-2) a 1st task specific output created by using the 1st characteristic information.

And, the 2nd learning device 200 may train the 1st surrogate network such that the (1_1)-st losses are minimized, and may transmit the (1_1)-st losses to the 1st learning device 100.

Then, the 1st learning device 100 may perform or support another device to perform a process of training the obfuscation network such that the (1_1)-st losses are minimized and such that one or more (2_1)-st losses, calculated by referring to the original data and the 1st obfuscated data, are maximized, to thereby allow the obfuscation network to be a 1st trained obfuscation network.

Thereafter, while increasing an integer k from 2 to n, the 1st learning device 100 may repeat the processes above, to thereby acquire an n-th trained obfuscation network, by training a previous trained obfuscation network using the (1_n)-th losses calculated from the n-th surrogate network.

That is, the 1st learning device 100 may input the original data into a (k−1)-th trained obfuscation network, to thereby allow the (k−1)-th trained obfuscation network to obfuscate the original data and thus to generate k-th obfuscated data, and may transmit the k-th obfuscated data to the 2nd learning device 200.

Then, the 2nd learning device 200 may input the k-th obfuscated data into a k-th surrogate network, to thereby allow the k-th surrogate network to generate k-th characteristic information by applying the learning operation to the k-th obfuscated data, and may calculate one or more (1_k)-th losses by referring to (i) the ground truth and (ii) at least one of (ii-1) the k-th characteristic information and (ii-2) a k-th task specific output created by using the k-th characteristic information.

And, the 2nd learning device 200 may train the k-th surrogate network such that the (1_k)-th losses are minimized, and may transmit the (1_k)-th losses to the 1st learning device 100.

Then, the 1st learning device 100 may perform or support another device to perform a process of training the (k−1)-th trained obfuscation network such that the (1_k)-th losses are minimized and such that one or more (2_k)-th losses, calculated by referring to the original data and the k-th obfuscated data, are maximized, to thereby allow the (k−1)-th trained obfuscation network to be a k-th trained obfuscation network. As a result of repeating the processes as such, the n-th trained obfuscation network may be generated.

Figure 4:
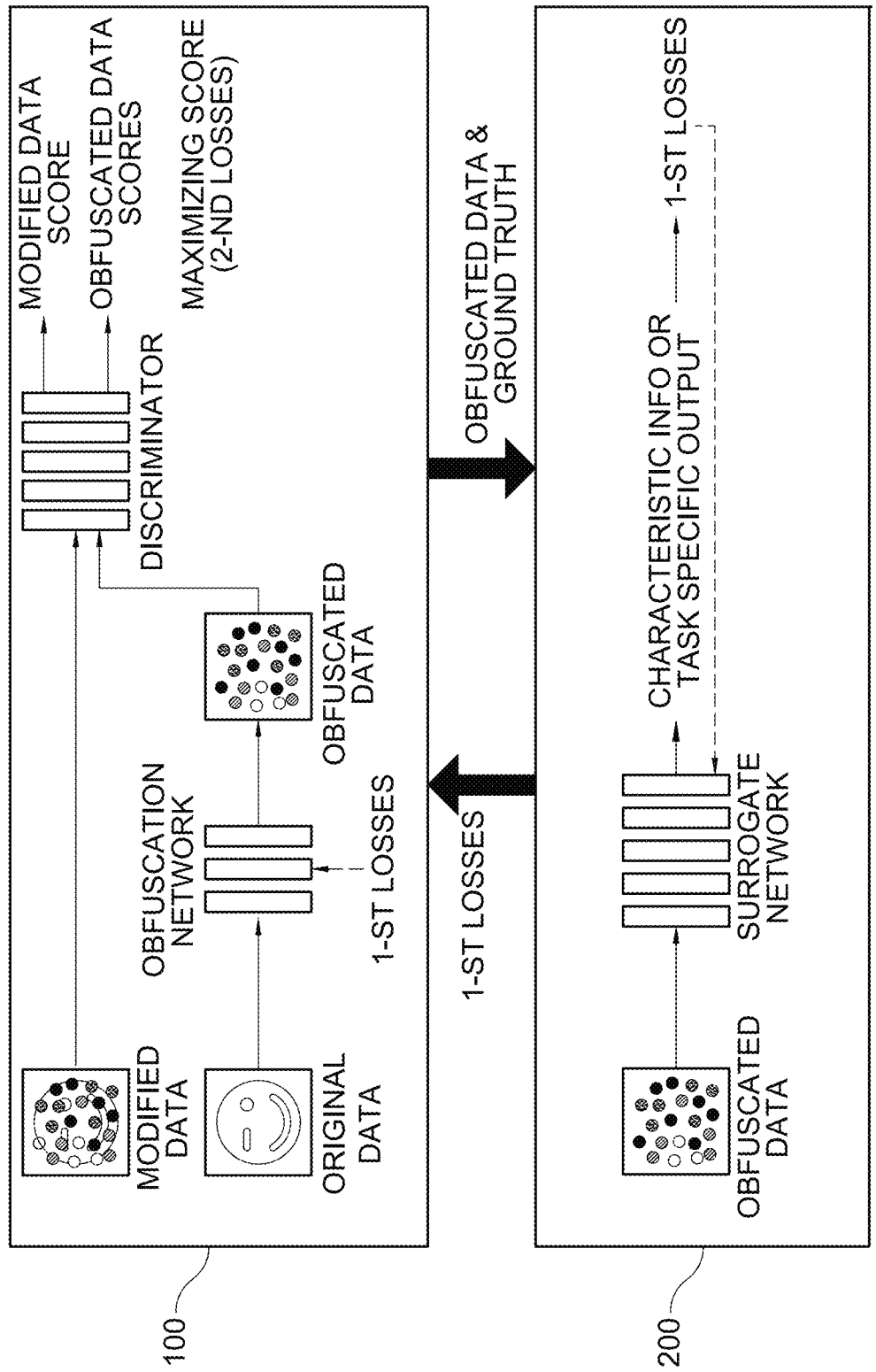
FIG. 4 is a drawing schematically illustrating a learning method for training the obfuscation network and for allowing the surrogate network to be trained in accordance with another example embodiment of the present disclosure.

FIG. 4 is a drawing schematically illustrating a learning method for training the obfuscation network which conceals, i.e., anonymizes, the original data and allowing the surrogate network to be trained by using the obfuscated data generated by the obfuscation network in accordance with another example embodiment of the present disclosure. In the description below, the part easily deducible from the explanation of FIGS. 2 and 3 will be omitted.

First, if the original data and its corresponding ground truth of the 1st party are acquired, the 1st learning device 100 may input the original data into the obfuscation network, to thereby allow the obfuscation network to obfuscate the original data and thus to generate the obfuscated data.

As another example, the 1st learning device 100 may input the modified data, created by modifying the original data, into the obfuscation network, to thereby allow the obfuscation network to generate the obfuscated data, as the case may be.

Next, the 1st learning device 100 may allow the obfuscated data and the ground truth, corresponding to the original data, to be transmitted to the 2nd learning device 200 corresponding to the 2nd party.

Then, if the obfuscated data and the ground truth are acquired from the 1st learning device 100, the 2nd learning device may input the obfuscated data into the surrogate network, to thereby allow the surrogate network to apply the learning operation to the obfuscated data and thus to generate the characteristic information corresponding to the obfuscated data.

Thereafter, the 2nd learning device 200 may calculate the 1st losses by referring to (i) the ground truth and (ii) at least one of (ii-1) the characteristic information and (ii-2) a task specific output created by using the characteristic information.

And, the 2nd learning device 200 may train the surrogate network such that the 1st losses are minimized, and may transmit the 1st losses to the 1st learning device 100.

Next, on condition that one or more obfuscated data scores have been acquired as the 2nd losses where the obfuscated data scores correspond to the obfuscated data inputted into the discriminator capable of determining whether data inputted thereto is real or fake, the 1st learning device 100 may perform or support another device to perform (i) a process of training the obfuscation network such that the 1st losses are minimized and such that the 2nd losses, which are the obfuscated data scores, are maximized, and (ii) a process of training the discriminator such that one or more modified data scores or one or more modified obfuscated data scores, respectively corresponding to modified data or modified obfuscated data inputted into the discriminator, are maximized and such that the obfuscated data scores are minimized. Herein, the modified data or the modified obfuscated data may be respectively generated by adding the random noise created through the random noise generating network (not illustrated) to the original data or the obfuscated data. As one example, the random noise generating network may be instructed to generate the random noise having the normal distribution N(0, σ), and the generated noise may be added to the original data or the obfuscated data, to thereby generate the modified data or the modified obfuscated data. Also, the modified data or the modified obfuscated data may be respectively generated by blurring the original data or the obfuscated data, or changing a resolution of the original data or the obfuscated data, as well as using the random noise, but the scope of the present disclosure is not limited thereto, and various ways of modifying the original data or the obfuscated data may be used.

Herein, a maximum of the modified data scores or the modified obfuscated data scores, respectively corresponding to the modified data or the modified obfuscated data inputted into the discriminator, may be 1 as a value for determining the modified data or the modified obfuscated data as real, and a minimum of the obfuscated data scores, corresponding to the obfuscated data inputted into the discriminator, may be 0 as a value for determining the obfuscated data as fake. That is, the discriminator may be trained to recognize the obfuscated data as the modified data or as the modified obfuscated data.

Figure 5:
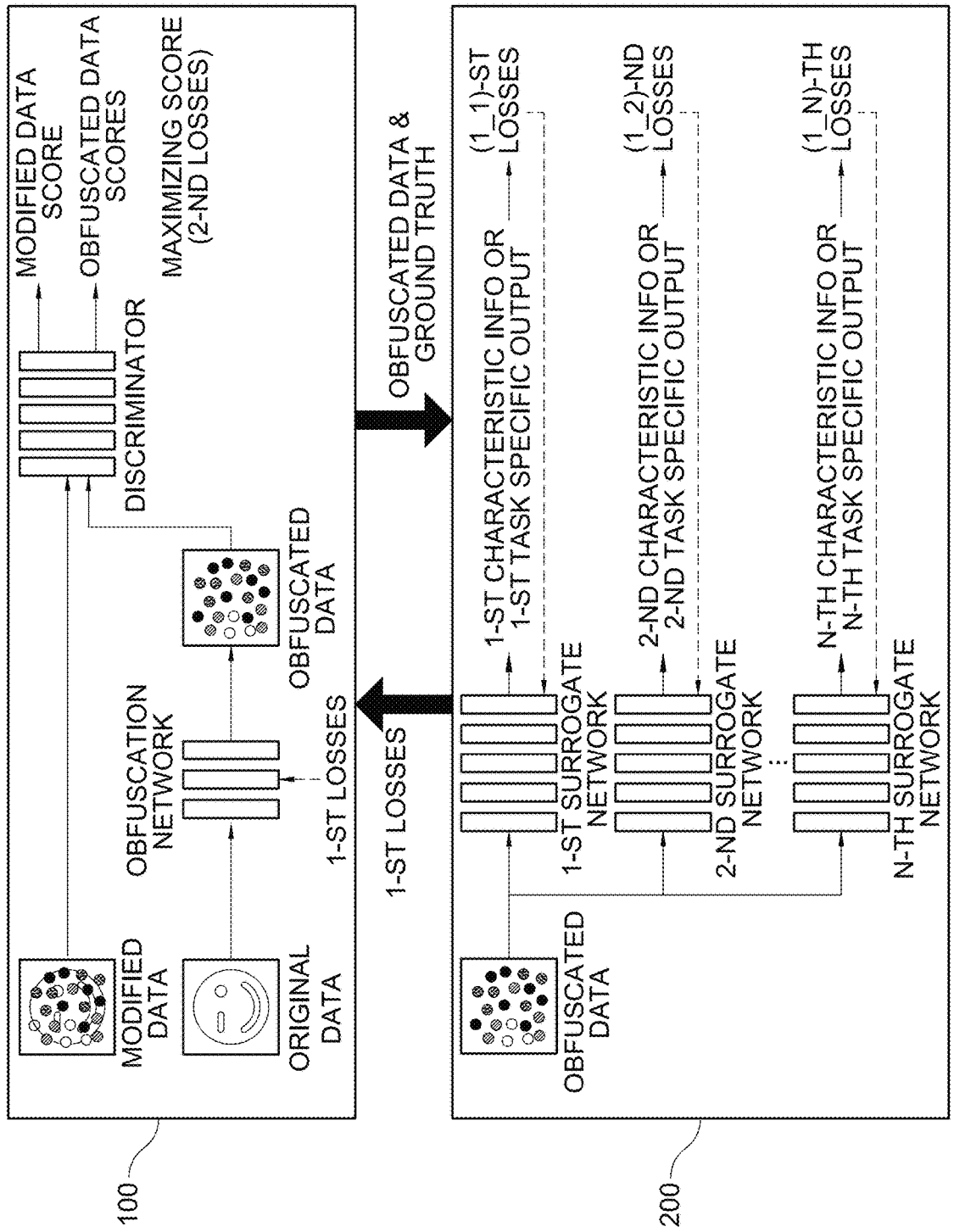
FIG. 5 is a drawing schematically illustrating another learning method for training the obfuscation network and for allowing the surrogate networks to be trained in accordance with another example embodiment of the present disclosure.

FIG. 5 is a drawing schematically illustrating a learning method for training the obfuscation network which conceals, i.e., anonymizes, the original data in accordance with another example embodiment of the present disclosure. Also, the surrogate network as shown in FIG. 4 is configured as the multiple surrogate networks. In the description below, the part easily deducible from the explanation of FIGS. 2 to 4 will be omitted.

First, if the original data and its corresponding ground truth of the 1st party are acquired, the 1st learning device 100 may input the original data into the obfuscation network, to thereby allow the obfuscation network to obfuscate the original data and thus to generate the obfuscated data.

As another example, the 1st learning device 100 may input the modified data, created by modifying the original data, into the obfuscation network, to thereby allow the obfuscation network to generate the obfuscated data, as the case may be.

Next, the 1st learning device 100 may allow the obfuscated data and the ground truth, corresponding to the original data, to be transmitted to the 2nd learning device 200 corresponding to the 2nd party.

Then, if the obfuscated data and the ground truth are acquired from the 1st learning device 100, the 2nd learning device may input the obfuscated data respectively into a 1st surrogate network to an n-th surrogate network, to thereby allow the 1st surrogate network to the n-th surrogate network to respectively generate 1st characteristic information to n-th characteristic information by applying corresponding learning operation of the 1st surrogate network to the n-th surrogate network to the obfuscated data.

Thereafter, the 2nd learning device 200 may calculate (i) one or more (1_1)-st losses by referring to (i-1) the ground truth and (i-2) at least one of the 1st characteristic information and a 1st task specific output created by using the 1st characteristic information to (ii) one or more (1_n)-th losses by referring to (ii-1) the ground truth and (ii-2) at least one of the n-th characteristic information and an n-th task specific output created by using the n-th characteristic information.

Next, the 2nd learning device 200 may train the 1st surrogate network to the n-th surrogate network respectively such that (i) the (1_1)-st losses to the (1_n)-th losses are respectively minimized or (ii) at least one average loss, which is averaged over the (1_1)-st losses to the (1_n)-th losses, is minimized.

And, the 2nd learning device 200 may transmit to the 1st learning device 100 (i) at least part of the (1_1)-st losses to the (1_n)-th losses as the 1st losses or (ii) the average loss as the 1st losses.

Meanwhile, a process of training the 1st surrogate network to the n-th surrogate network by the 2nd learning device 200 and a process of transmitting the 1st losses from the 2nd learning device 200 to the 1st learning device 100 may occur in a different order and may occur independently of each other.

Next, if the 1st losses are acquired from the 2nd learning device 200, the 1st learning device 100 may perform or support another device to perform (i) a process of training the obfuscation network such that the 1st losses are minimized and such that the 2nd losses, which are the obfuscated data scores corresponding to the obfuscated data inputted into the discriminator, are maximized, and (ii) a process of training the discriminator such that one or more modified data scores or one or more modified obfuscated data scores, respectively corresponding to modified data or modified obfuscated data inputted into the discriminator, are maximized and such that the obfuscated data scores are minimized.

That is, the 1st learning device 100 may perform or support another device to perform (i) one of (i-1) a process of training the obfuscation network such that at least part of the (1_1)-st losses to the (1_N)-th losses are minimized and such that the 2nd losses, which are the obfuscated data scores corresponding to the obfuscated data inputted into the discriminator, are maximized, and (i-2) a process of training the obfuscation network such that the average loss is minimized and such that the 2nd losses are maximized, and (ii) a process of training the discriminator such that the modified data scores or the modified obfuscated data scores, respectively corresponding to the modified data or the modified obfuscated data inputted into the discriminator, are maximized, and such that the obfuscated data scores are minimized.

Meanwhile, in the above, the 2nd learning device 200 is described as transmitting to the 1st learning device 100 (i) at least part of the (1_1)-st losses to the (1_n)-th losses as the 1st losses or (ii) the average loss as the 1st losses, and the 1st learning device 100 is described as training the obfuscation network by using the 1st losses and the 2nd losses, however, as another example, the 2nd learning device 200 may sequentially transmit each of the (1_1)-st losses to the (1_n)-th losses to the 1st learning device 100 as the 1st losses, to thereby allow the 1st learning device 100 to train the obfuscation network sequentially using each of the (1_1)-st losses to the (1_n)-th losses.

That is, the 1st learning device 100 may input the original data into the obfuscation network, to thereby allow the obfuscation network to obfuscate the original data and thus to generate 1st obfuscated data.

And, the 1st learning device 100 may allow the 1st obfuscated data and the ground truth to be transmitted to the 2nd learning device 200.

Then, the 2nd learning device 200 may input the 1st obfuscated data into the 1st surrogate network, to thereby allow the 1st surrogate network to generate the 1st characteristic information by applying the learning operation to the 1st obfuscated data, and may calculate the (1_1)-st losses by referring to (i) the ground truth and (ii) at least one of (ii-1) the 1st characteristic information and (ii-2) a 1st task specific output created by using the 1st characteristic information.

And, the 2nd learning device 200 may train the 1st surrogate network such that the (1_1)-st losses are minimized, and may transmit the (1_1)-st losses to the 1st learning device 100.

Then, the 1st learning device 100 may perform or support another device to perform (i) a process of training the obfuscation network such that the (1_1)-st losses are minimized and such that one or more (2_1)-st losses, which are one or more 1st obfuscated data scores corresponding to the 1st obfuscated data inputted into the discriminator, are maximized, to thereby allow the obfuscation network to be a 1st trained obfuscation network, and (ii) a process of training the discriminator such that one or more 1st modified data scores or one or more 1st modified obfuscated data score, respectively corresponding to the modified data or 1st modified obfuscated data created by modifying the 1st obfuscated data, inputted into the discriminator are maximized and such that the 1st obfuscated data scores are minimized, to thereby allow the discriminator to be a 1st trained discriminator.

Thereafter, while increasing an integer k from 2 to n, the 1st learning device 100 may repeat the processes above, to thereby acquire an n-th trained obfuscation network, by training a previous trained obfuscation network using the (1_n)-th losses calculated from the n-th surrogate network.

That is, the 1st learning device 100 may input the original data into a (k−1)-th trained obfuscation network, to thereby allow the (k−1)-th trained obfuscation network to obfuscate the original data and thus to generate k-th obfuscated data, and may transmit the k-th obfuscated data to the 2nd learning device 200.

Then, the 2nd learning device 200 may input the k-th obfuscated data into the k-th surrogate network, to thereby allow the k-th surrogate network to generate the k-th characteristic information by applying the learning operation to the k-th obfuscated data, and may calculate the (1_k)-th losses by referring to (i) the ground truth and (ii) at least one of (ii-1) the k-th characteristic information and (ii-2) a k-th task specific output created by using the k-th characteristic information.

And, the 2nd learning device 200 may train the k-th surrogate network such that the (1_k)-th losses are minimized, and may transmit the (1_k)-th losses to the 1st learning device 100.

Then, the 1st learning device 100 may perform or support another device to perform (i) a process of training the (k−1)-th trained obfuscation network such that the (1_k)-th losses are minimized and such that the (2_k)-th losses, which are one or more k-th obfuscated data scores corresponding to the k-th obfuscated data inputted into the (k−1)-th trained discriminator, are maximized, to thereby allow the (k−1)-th trained obfuscation network to be a k-th trained obfuscation network, and (ii) a process of training the (k−1)-th trained discriminator such that one or more k-th modified data scores or one or more k-th modified obfuscated data scores, respectively corresponding to the modified data or k-th modified obfuscated data created by modifying the k-th obfuscated data, inputted into the (k−1)-th trained discriminator are maximized and such that the k-th obfuscated data scores are minimized, to thereby allow the (k−1)-th trained discriminator to be a k-th trained discriminator. As a result of repeating the processes as such, an n-th trained obfuscation network may be generated.

Figure 6:
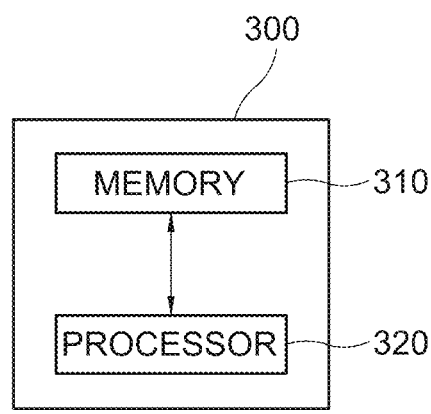
FIG. 6 is a drawing schematically illustrating a testing device for testing the obfuscation network trained in accordance with one example embodiment of the present disclosure.

FIG. 6 is a drawing schematically illustrating a testing device for testing a trained obfuscation network in accordance with one example embodiment of the present disclosure.

By referring to FIG. 6, the testing device 300 in accordance with one example embodiment of the present disclosure may include a memory 310 for storing instructions to test the trained obfuscation network which has been trained to obfuscate original data for testing and generate obfuscated data for testing, such that the surrogate network outputs a 1st result calculated by using the obfuscated data for testing, same or similar to a 2nd result calculated by using the original data for testing, and a processor 320 for performing processes to test the trained obfuscation network according to the instructions in the memory 310.

Specifically, the testing device 300 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, on condition that the obfuscation network has been trained in accordance with the learning method by referring to FIGS. 2 to 5, if the original data for testing to be used for concealing, i.e., anonymizing, is inputted, according to the instructions stored in the memory 310, the processor 320 of the testing device 300 may input the original data for testing into the obfuscation network, to thereby allow the obfuscation network to generate the obfuscated data for testing by obfuscating the original data for testing.

As one example, on condition that the 1st learning device has performed or supported another device to perform (i) a process of inputting original data for training of the 1st party into the obfuscation network, to thereby allow the obfuscation network to generate obfuscated data for training by obfuscating the original data for training, (ii) a process of allowing the obfuscated data for training and the ground truth corresponding to the original data for training to be transmitted to the 2nd learning device corresponding to the 2nd party, to thereby instruct the 2nd learning device to (ii-1) input the obfuscated data for training into the surrogate network, and thus instruct the surrogate network to generate characteristic information for training by applying the learning operation of the surrogate network to the obfuscated data for training, (ii-2) calculate the 1st losses by referring to the ground truth and at least one of the characteristic information for training and a task specific output for training created by using the characteristic information for training, (ii-3) train the surrogate network such that the 1st losses are minimized, and (ii-4) transmit the 1st losses to the 1st learning device, and (iii) if the 1st losses are acquired from the 2nd learning device, a process of training the obfuscation network such that the 1st losses are minimized and such that the 2nd losses calculated by referring to the original data for training and the obfuscated data for training are maximized, the processor 320 of the testing device 300 may perform or support another device to perform a process of acquiring original data for testing to be used for concealing, i.e., anonymizing.

And, according to the instructions stored in the memory 310, the processor 320 of the testing device 300 may input the original data for testing into the obfuscation network, to thereby allow the obfuscation network to generate the obfuscated data for testing by obfuscating the original data for testing.

Figure 7:
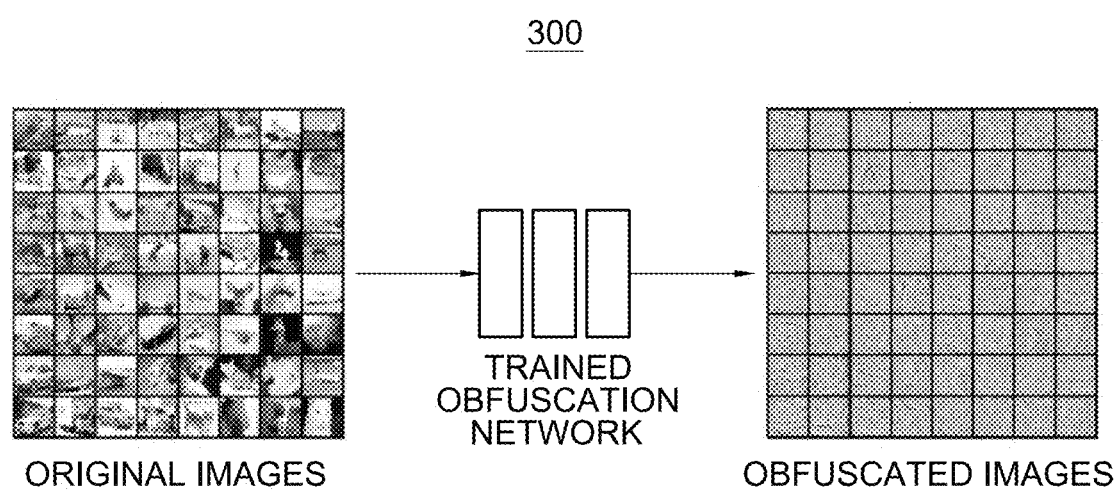
FIG. 7 is a drawing schematically illustrating a testing method for testing the obfuscation network trained in accordance with one example embodiment of the present disclosure.

FIG. 7 is a drawing schematically illustrating a testing method for testing the obfuscation network trained in accordance with one example embodiment of the present disclosure.

By referring to FIG. 7, the testing device 300 may input the original data for testing, for example, original images on a left side of FIG. 7, into the obfuscation network which has been trained to obfuscate the original data such that the surrogate network outputs a 1st result calculated by using the obfuscated data, same or similar to a 2nd result calculated by using the original data, and allow the obfuscation network to obfuscate the original data for testing and thus to output the obfuscated data for testing, e.g., obfuscated images on a right side of FIG. 7.

For reference, the left side of FIG. 7 is a drawing exemplarily illustrating 64 image samples selected from the CIFAR-10 dataset which includes images collected and labeled by Canadian Institute for Advanced Research (CIFAR) for image classification.

The obfuscated data generated by concealing, i.e., anonymizing, the image samples on the left side of FIG. 7 used as the original data, in accordance with the present disclosure, are shown on the right side of FIG. 7.

By referring to FIG. 7, the 64 obfuscated data on the right side of FIG. 7 which are concealed in accordance with the present disclosure are visually different from the 64 original data on the left side of FIG. 7, but if the 64 obfuscated data are inputted into the surrogate network, the surrogate network outputs the 1st result same or similar to the 2nd result created by inputting the original data into the surrogate network.

Meanwhile, the trained obfuscation network may have been trained beforehand by processes similar to those in description of FIGS. 2 to 5.

Meanwhile, the obfuscated data which are concealed, i.e., anonymized, by the trained obfuscation network in accordance with the present disclosure may be provided or sold to a buyer of image big data.

Also, in accordance with the present disclosure, when the concealed image data are provided or sold to the buyer, the testing method of the trained obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate concealed data from the original data owned by the buyer or acquired from other sources, and use the concealed data for his/her own surrogate network. Also, the buyer may use at least two of the concealed data, the original image data owned by the buyer or acquired from other sources, and the concealed image data provided or sold to the buyer, together for the buyer's surrogate network.

Meanwhile, if the testing method of the trained obfuscation network is implemented as the program instructions that can be executed by a variety of computer components then computational overhead may occur in the computing devices of the buyer when the accuracy is set as high, thus, in accordance with one example embodiment of the present disclosure, the buyer is allowed to lower the accuracy to prevent the computational overhead.

The present disclosure has an effect of performing concealment, i.e., anonymization, in a simple and accurate way, since a process of searching general data for personal identification information is eliminated.

The present disclosure has another effect of protecting privacy and security of the original data by generating concealed data, i.e., anonymized data through irreversibly obfuscating the original data.

The present disclosure has still another effect of generating the obfuscated data recognized as similar or same by a computer but recognized as different by humans.

The present disclosure has still yet another effect of stimulating a big data trade market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method of a 1st learning device for training an obfuscation network which conceals original data to be used for machine learning, and for allowing a 2nd learning device to train a surrogate network which uses obfuscated data generated by the obfuscation network, comprising steps of:
   (a) the 1st learning device performing or supporting another device to perform a process of inputting the original data of a 1st party into the obfuscation network, to thereby allow the obfuscation network to generate the obfuscated data by obfuscating the original data, wherein the 1st party corresponds to the 1st learning device and wherein the 1st party is a party who is determined as an owner of the original data and its corresponding ground truth or is an entity to whom the original data and its corresponding ground truth are delegated by the owner;
   (b) the 1st learning device performing or supporting another device to perform a process of allowing the obfuscated data and the ground truth to be transmitted to the 2nd learning device corresponding to a 2nd party wherein the 2nd party is a party who is configured to train the surrogate network by using the original data and the ground truth of the 1st party, to thereby allow the 2nd learning device to
      (i) input the obfuscated data into the surrogate network, and thus instruct the surrogate network to generate characteristic information by applying at least one learning operation of the surrogate network to the obfuscated data,
      (ii) calculate one or more 1st losses by referring to the ground truth and at least one of the characteristic information and a task specific output created by using the characteristic information,
      (iii) train the surrogate network such that the 1st losses are minimized, and
      (iv) transmit the 1st losses to the 1st learning device; and
   (c) the 1st learning device, when the 1st losses are acquired from the 2nd learning device, performing or supporting another device to perform a process of training the obfuscation network such that the 1st losses are minimized and such that one or more 2nd losses calculated by referring to the original data and the obfuscated data are maximized;
wherein the surrogate network includes a 1st surrogate network to an n-th surrogate network wherein n is an integer greater than 2,
wherein, at the step of (b), the 1st learning device performs or supports another device to perform a process of allowing the obfuscated data and the ground truth to be transmitted to the 2nd learning device, to thereby allow the 2nd learning device to
   (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data,
   (ii) calculate
      (ii-1) one or more $(1\_1)$-st losses by referring to the ground truth and at least one of the 1st characteristic information and a 1st task specific output created by using the 1st characteristic information to
      (ii-2) one or more $(1\_n)$-th losses by referring to the ground truth and at least one of the n-th characteristic information and an n-th task specific output created by using the n-th characteristic information,
   (iii) train the 1st surrogate network to the n-th surrogate network respectively such that
      (iii-1) the $(1\_1)$-st losses to the $(1\_n)$-th losses are respectively minimized or
      (iii-2) at least one average loss, which is averaged over the $(1\_1)$-st losses to the $(1\_n)$-th losses, is minimized, and
   (iv) transmit to the 1st learning device (iv-1) at least part of the $(1\_1)$-st losses to the $(1\_n)$-th losses as the 1st losses or (iv-2) the average loss as the 1st losses, and
wherein, at the step of (c), the 1st learning device performs or supports another device to perform one of
   (i) a process of training the obfuscation network such that at least part of the $(1\_1)$-st losses to the $(1\_n)$-th losses are minimized and such that the 2nd losses are maximized, and (ii) a process of training the obfuscation network such that the average loss is minimized and such that the 2nd losses are maximized.

2. The method of claim 1, wherein, at the step of (c), the 1st learning device
   (i) measures at least one quality by referring to at least part of an entropy and a degree of noise of the obfuscated data, and
   (ii) trains the obfuscation network such that the 1st losses are minimized by further referring to the measured quality.

3. A method of a 1st learning device for training an obfuscation network which conceals original data to be used for machine learning, and for allowing a 2nd learning device to train a surrogate network which uses obfuscated data generated by the obfuscation network, comprising steps of:

(a) the 1st learning device performing or supporting another device to perform a process of inputting the original data of a 1st party into the obfuscation network, to thereby allow the obfuscation network to generate the obfuscated data by obfuscating the original data, wherein the 1st party corresponds to the 1st learning device and wherein the 1st party is a party who is determined as an owner of the original data and its corresponding ground truth or is an entity to whom the original data and its corresponding ground truth are delegated by the owner;

(b) the 1st learning device performing or supporting another device to perform a process of allowing the obfuscated data and the ground truth to be transmitted to the 2nd learning device corresponding to a 2nd party wherein the 2nd party is a party who is configured to train the surrogate network by using the original data and the ground truth of the 1st party, to thereby allow the 2nd learning device to
      (i) input the obfuscated data into the surrogate network, and thus instruct the surrogate network to generate characteristic information by applying at least one learning operation of the surrogate network to the obfuscated data,
      (ii) calculate one or more 1st losses by referring to the ground truth and at least one of the characteristic information and a task specific output created by using the characteristic information,
      (iii) train the surrogate network such that the 1st losses are minimized, and
      (iv) transmit the 1st losses to the 1st learning device; and (c) the 1st learning device, when the 1st losses are acquired from the 2nd learning device, performing or supporting another device to perform a process of training the obfuscation network such that the 1st losses are minimized and such that one or more 2nd losses calculated by referring to the original data and the obfuscated data are maximized;

wherein the surrogate network includes a 1st surrogate network to an n-th surrogate network wherein n is an integer greater than 2, wherein, at the step of (a), the 1st learning device performs or supports another device to perform a process of inputting the original data into the obfuscation network, to thereby allow the obfuscation network to obfuscate the original data and thus to generate 1st obfuscated data, wherein, at the step of (b), the 1st learning device allows the 1st obfuscated data and the ground truth to be transmitted to the 2nd learning device, to thereby allow the 2nd learning device to
      (i) input the 1st obfuscated data into the 1st surrogate network, and thus instruct the 1st surrogate network to generate 1st characteristic information by applying at least one learning operation of the 1st surrogate network to the 1st obfuscated data,
      (ii) calculate one or more (1_1)-st losses by referring to the ground truth and at least one of the 1st characteristic information and a 1st task specific output created by using the 1st characteristic information,
      (iii) train the 1st surrogate network such that the (1_1)-st losses are minimized, and
      (iv) transmit the (1_1)-st losses to the 1st learning device, wherein, at the step of (c), the 1st learning device performs or supports another device to perform a process of training the obfuscation network such that the (1_1)-st losses are minimized and such that one or more (2_1)-st losses calculated by referring to the original data and the 1st obfuscated data are maximized, to thereby allow the obfuscation network to be a 1st trained obfuscation network, and wherein, while increasing an integer k from 2 to n, the 1st learning device performs or supports another device to perform
      (I) a process of inputting the original data into a (k−1)-th trained obfuscation network, to thereby allow the (k−1)-th trained obfuscation network to generate k-th obfuscated data by obfuscating the original data,
      (II) a process of allowing the k-th obfuscated data to be transmitted to the 2nd learning device, to thereby allow the 2nd learning device to
         (i) input the k-th obfuscated data into a k-th surrogate network, and thus instruct the k-th surrogate network to generate k-th characteristic information by applying the learning operation of the k-th surrogate network to the k-th obfuscated data,
         (ii) calculate one or more (1_k)-th losses by referring to the ground truth and at least one of the k-th characteristic information and a k-th task specific output created by using the k-th characteristic information, and
         (iii) train the k-th surrogate network such that the (1_k)-th losses are minimized, and transmit the (1_k)-th losses to the 1st learning device, and
      (III) a process of training the (k−1)-th trained obfuscation network such that the (1_k)-th losses are minimized and such that one or more (2_k)-th losses calculated by referring to the original data and the k-th obfuscated data are maximized, and thus allowing the (k−1)-th trained obfuscation network to be a k-th trained obfuscation network.

4. A method of a 1st learning device for training an obfuscation network which conceals original data to be used for machine learning, and for allowing a 2nd learning device to train a surrogate network which uses obfuscated data generated by the obfuscation network, comprising steps of:
   (a) the 1st learning device performing or supporting another device to perform a process of inputting the original data of a 1st party into the obfuscation network, to thereby allow the obfuscation network to generate the obfuscated data by obfuscating the original data, wherein the 1st party corresponds to the 1st learning device and wherein the 1st party is a party who is determined as an owner of the original data and its corresponding ground truth or is an entity to whom the original data and its corresponding ground truth are delegated by the owner;

(b) the 1st learning device performing or supporting another device to perform a process of allowing the obfuscated data and the ground truth to be transmitted to the 2nd learning device corresponding to a 2nd party wherein the 2nd party is a party who is configured to train the surrogate network by using the original data and the ground truth of the 1st party, to thereby allow the 2nd learning device to (i) input the obfuscated data into the surrogate network, and thus instruct the surrogate network to generate characteristic information by applying at least one learning operation of the surrogate network to the obfuscated data, (ii) calculate one or more 1st losses by referring to the ground truth and at least one of the characteristic information and a task specific output created by using the characteristic information, (iii) train the surrogate network such that the 1st losses are minimized, and (iv) transmit the 1st losses to the 1st learning device; and (c) the 1st learning device, when the 1st losses are acquired from the 2nd learning device, performing or supporting another device to perform a process of training the obfuscation network such that the 1st losses are minimized and such that one or more 2nd losses calculated by referring to the original data and the obfuscated data are maximized, wherein, at the step of (c), when one or more obfuscated data scores have been acquired as the 2nd losses wherein the obfuscated data scores correspond to the obfuscated data inputted into a discriminator capable of determining whether data inputted thereto is real or fake, the 1st learning device performs or supports another device to perform (i) a process of training the obfuscation network such that the 1st losses are minimized and such that the 2nd losses are maximized, and (ii) a process of training the discriminator such that one or more modified data scores or one or more modified obfuscated data scores, respectively corresponding to modified data or modified obfuscated data inputted into the discriminator, are maximized and such that the obfuscated data scores are minimized, wherein the modified data or the modified obfuscated data is generated by respectively modifying the original data or the obfuscated data.

5. The method of claim 4, wherein the surrogate network includes a 1st surrogate network to an n-th surrogate network wherein n is an integer greater than 2, wherein, at the step of (b), the 1st learning device performs or supports another device to perform a process of allowing the obfuscated data and the ground truth to be transmitted to the 2nd learning device, to thereby allow the 2nd learning device to (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data, (ii) calculate (ii-1) one or more (1_1)-st losses by referring to the ground truth and at least one of the 1st characteristic information and a 1st task specific output created by using the 1st characteristic information to (ii-2) one or more (1_n)-th losses by referring to the ground truth and at least one of the n-th characteristic information and an n-th task specific output created by using the n-th characteristic information, (iii) train the 1st surrogate network to the n-th surrogate network respectively such that (iii-1) the (1_1)-st losses to the (1_n)-th losses are respectively minimized or (iii-2) at least one average loss, which is averaged over the (1_1)-st losses to the (1_n)-th losses, is minimized, and (iv) transmit to the 1st learning device (iv-1) at least part of the (1_1)-st losses to the (1_n)-th losses as the 1st losses or (iv-2) the average loss as the 1st losses, and wherein, at the step of (c), the 1st learning device performs or supports another device to perform (i) one of (i-1) a process of training the obfuscation network such that at least part of the (1_1)-st losses to the (1_n)-th losses are minimized and such that the 2nd losses, which are the obfuscated data scores corresponding to the obfuscated data inputted into the discriminator, are maximized, and (i-2) a process of training the obfuscation network such that the average loss is minimized and such that the 2nd losses are maximized, and (ii) a process of training the discriminator such that the modified data scores or the modified obfuscated data scores, respectively corresponding to the modified data or the modified obfuscated data inputted into the discriminator, are maximized, and such that the obfuscated data scores are minimized.

6. The method of claim 4, wherein the surrogate network includes a 1st surrogate network to an n-th surrogate network wherein n is an integer greater than 2, wherein, at the step of (a), the 1st learning device performs or supports another device to perform a process of inputting the original data into the obfuscation network, to thereby allow the obfuscation network to obfuscate the original data and thus to generate 1st obfuscated data, wherein, at the step of (b), the 1st learning device allows the 1st obfuscated data and the ground truth to be transmitted to the 2nd learning device, to thereby allow the 2nd learning device to (i) input the 1st obfuscated data into the 1st surrogate network, and thus instruct the 1st surrogate network to generate 1st characteristic information by applying at least one learning operation of the 1st surrogate network to the 1st obfuscated data, (ii) calculate one or more (1_1)-st losses by referring to the ground truth and at least one of the 1st characteristic information and a 1st task specific output created by using the 1st characteristic information, (iii) train the 1st surrogate network such that the (1_1)-st losses are minimized, and (iv) transmit the (1_1)-st losses to the 1st learning device,
wherein, at the step of (c), the 1st learning device performs or supports another device to perform
(i) a process of training the obfuscation network such that the (1_1)-st losses are minimized and such that one or more (2_1)-st losses, which are one or more 1st obfuscated data scores corresponding to the 1st obfuscated data inputted into the discriminator, are maximized, to thereby allow the obfuscation network to be a 1st trained obfuscation network, and
(ii) a process of training the discriminator such that one or more 1st modified data scores or one or more 1st modified obfuscated data scores, respectively corresponding to the modified data or 1st modified obfuscated data created by modifying the 1st obfuscated data, inputted into the discriminator are maximized and such that the 1st obfuscated data scores are minimized, to thereby allow the discriminator to be a 1st trained discriminator, and
wherein, while increasing an integer k from 2 to n, the 1st learning device performs or supports another device to perform
(I) a process of inputting the original data into a (k−1)-th trained obfuscation network, to thereby allow the (k−1)-th trained obfuscation network to generate k-th obfuscated data by obfuscating the original data,
(II) a process of allowing the k-th obfuscated data to be transmitted to the 2nd learning device, to thereby allow the 2nd learning device to
(i) input the k-th obfuscated data into a k-th surrogate network, and thus instruct the k-th surrogate network to generate k-th characteristic information by applying the learning operation of the k-th surrogate network to the k-th obfuscated data,
(ii) calculate one or more (1_k)-th losses by referring to the ground truth and at least one of the k-th characteristic information and a k-th task specific output created via using the k-th characteristic information, and
(iii) train the k-th surrogate network such that the (1_k)-th losses are minimized, and transmit the (1_k)-th losses to the 1st learning device, and
(III)
(III-1) a process of training the (k−1)-th trained obfuscation network such that the (1_k)-th losses are minimized and such that one or more (2_k)-th losses, which are one or more k-th obfuscated data scores corresponding to the k-th obfuscated data inputted into a (k−1)-th trained discriminator, data are maximized, and thus allowing the (k−1)-th trained obfuscation network to be a k-th trained obfuscation network,
(III-2) a process of training the (k−1)-th trained discriminator such that one or more k-th modified data scores or one or more k-th modified obfuscated data scores, respectively corresponding to the modified data or k-th modified obfuscated data created by modifying the k-th obfuscated data inputted into the (k−1)-th trained discriminator and such that the k-th obfuscated data scores are minimized, to thereby allow the (k−1)-th trained discriminator to be a k-th trained discriminator.

7. The method of claim 4, wherein a maximum of the modified data scores or the modified obfuscated data scores, respectively corresponding to the modified data or the modified obfuscated data inputted into the discriminator, is 1 as a value for determining the modified data or the modified obfuscated data as real, and a minimum of the obfuscated data scores, corresponding to the obfuscated data inputted into the discriminator, is 0 as a value for determining the obfuscated data as fake.

8. A method for testing an obfuscation network, comprising steps of:
(a) when a 1st learning device has performed or supported another device to perform
(i) a process of inputting original data for training of a 1st party into the obfuscation network, to thereby allow the obfuscation network to generate obfuscated data for training by obfuscating the original data for training, wherein the 1st party corresponds to the 1st learning device and wherein the 1st party is a party who is determined as an owner of the original data for training and its corresponding ground truth or is an entity to whom the original data for training and its corresponding ground truth are delegated by the owner,
(ii) a process of allowing the obfuscated data for training and the ground truth to be transmitted to a 2nd learning device corresponding to a 2nd party wherein the 2nd party is a party who is configured to train a surrogate network by using the original data for training and the ground truth of the 1st party, to thereby allow the 2nd learning device to
(ii-1) input the obfuscated data for training into the surrogate network, and thus instruct the surrogate network to generate characteristic information for training by applying at least one learning operation of the surrogate network to the obfuscated data for training,
(ii-2) calculate one or more 1st losses by referring to the ground truth and at least one of the characteristic information for training and a task specific output for training created by using the characteristic information for training,
(ii-3) train the surrogate network such that the 1st losses are minimized, and
(ii-4) transmit the 1st losses to the 1st learning device, and
(iii) when the 1st losses are acquired from the 2nd learning device, a process of training the obfuscation network such that the 1st losses are minimized and such that one or more 2nd losses calculated by referring to the original data for training and the obfuscated data for training are maximized, a testing device performing or supporting another device to perform a process of acquiring original data for testing to be concealed; and
(b) the testing device performing or supporting another device to perform a process of the original data for testing into the obfuscation network, to thereby allow the obfuscation network to generate obfuscated data for testing by obfuscating the original data for testing.

9. The method of claim 8, wherein, at the step of (a), when one or more obfuscated data scores for training have been acquired as the 2nd losses wherein the obfuscated data scores for training correspond to the obfuscated data for training inputted into a discriminator capable of determining whether data inputted thereto is real or fake, the 1st learning device has completed or supported another device to complete (i) a process of training the obfuscation network such that the 1st losses are minimized and such that the 2nd losses are maximized, and (ii) a process of training the discriminator such that one or more modified data scores for training or one or more modified obfuscated data scores for training, respectively corresponding to modified data for training or modified obfuscated data for training inputted into the discriminator, are maximized and such that the obfuscated data scores are minimized, wherein the modified data for training or the modified obfuscated data for training is generated by respectively modifying the original data for training or the obfuscated data for training.

10. A 1st learning device for training an obfuscation network which conceals original data to be used for machine learning, and for allowing a 2nd learning device to train a surrogate network which uses obfuscated data generated by the obfuscation network, comprising:

at least one memory that stores instructions; and at least one processor configured to execute the instructions to perform or support another device to perform:

(I) a process of inputting the original data of a 1st party into the obfuscation network, to thereby allow the obfuscation network to generate the obfuscated data by obfuscating the original data, wherein the 1st party corresponds to the 1st learning device and wherein the 1st party is a party who is determined as an owner of the original data and its corresponding ground truth or is an entity to whom the original data and its corresponding ground truth are delegated by the owner, (II) a process of allowing the obfuscated data and the ground truth to be transmitted to the 2nd learning device corresponding to a 2nd party wherein the 2nd party is a party who is configured to train the surrogate network by using the original data and the ground truth of the 1st party, to thereby allow the 2nd learning device to (i) input the obfuscated data into the surrogate network, and thus instruct the surrogate network to generate characteristic information by applying at least one learning operation of the surrogate network to the obfuscated data, (ii) calculate one or more 1st losses by referring to the ground truth and at least one of the characteristic information and a task specific output created by using the characteristic information, (iii) train the surrogate network such that the 1st losses are minimized, and (iv) transmit the 1st losses to the 1st learning device, and (III) when the 1st losses are acquired from the 2nd learning device, a process of training the obfuscation network such that the 1st losses are minimized and such that one or more 2nd losses calculated by referring to the original data and the obfuscated data are maximized.

11. The 1st learning device of claim 10, wherein the surrogate network includes a 1st surrogate network to an n-th surrogate network wherein n is an integer greater than 2, wherein, at the process of (II), the processor performs or supports another device to perform a process of allowing the obfuscated data and the ground truth to be transmitted to the 2nd learning device, to thereby allow the 2nd learning device to (i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data, (ii) calculate (ii-1) one or more $(1\_1)$-st losses by referring to the ground truth and at least one of the 1st characteristic information and a 1st task specific output created by using the 1st characteristic information to (ii-2) one or more $(1\_n)$-th losses by referring to the ground truth and at least one of the n-th characteristic information and an n-th task specific output created by using the n-th characteristic information, (iii) train the 1st surrogate network to the n-th surrogate network respectively such that (iii-1) the $(1\_1)$-st losses to the $(1\_n)$-th losses are respectively minimized or (iii-2) at least one average loss, which is averaged over the $(1\_1)$-st losses to the $(1\_n)$-th losses, is minimized, and (iv) transmit to the 1st learning device (iv-1) at least part of the $(1\_1)$-st losses to the $(1\_n)$-th losses as the 1st losses or (iv-2) the average loss as the 1st losses, and wherein, at the process of (III), the processor performs or supports another device to perform one of (i) a process of training the obfuscation network such that at least part of the $(1\_1)$-st losses to the $(1\_n)$-th losses are minimized and such that the 2nd losses are maximized, and (ii) a process of training the obfuscation network such that the average loss is minimized and such that the 2nd losses are maximized.

12. The 1st learning device of claim 10, wherein the surrogate network includes a 1st surrogate network to an n-th surrogate network wherein n is an integer greater than 2, wherein, at the process of (I), the processor performs or supports another device to perform a process of inputting the original data into the obfuscation network, to thereby allow the obfuscation network to obfuscate the original data and thus to generate 1st obfuscated data, wherein, at the process of (II), the processor allows the 1st obfuscated data and the ground truth to be transmitted to the 2nd learning device, to thereby allow the 2nd learning device to (i) input the 1st obfuscated data into the 1st surrogate network, and thus instruct the 1st surrogate network to generate 1st characteristic information by applying at least one learning operation of the 1st surrogate network to the 1st obfuscated data, (ii) calculate one or more $(1\_1)$-st losses by referring to the ground truth and at least one of the 1st characteristic information and a 1st task specific output created by using the 1st characteristic information, (iii) train the 1st surrogate network such that the $(1\_1)$-st losses are minimized, and (iv) transmit the $(1\_1)$-st losses to the 1st learning device, wherein, at the process of (III), the processor performs or supports another device to perform a process of training the obfuscation network such that the (1_1)-st losses are minimized and such that one or more (2_1)-st losses calculated by referring to the original data and the 1st obfuscated data are maximized, to thereby allow the obfuscation network to be a 1st trained obfuscation network, and wherein, while increasing an integer k from 2 to n, the processor performs or supports another device to perform (I) a process of inputting the original data into a (k−1)-th trained obfuscation network, to thereby allow the (k−1)-th trained obfuscation network to generate k-th obfuscated data by obfuscating the original data, (II) a process of allowing the k-th obfuscated data to be transmitted to the 2nd learning device, to thereby instruct the 2nd learning device to
(i) input the k-th obfuscated data into a k-th surrogate network, and thus allow the k-th surrogate network to generate k-th characteristic information by applying the learning operation of the k-th surrogate network to the k-th obfuscated data,
(ii) calculate one or more (1_k)-th losses by referring to the ground truth and at least one of the k-th characteristic information and a k-th task specific output created by using the k-th characteristic information, and
(iii) train the k-th surrogate network such that the (1_k)-th losses are minimized, and transmit the (1_k)-th losses to the 1st learning device, and (III) a process of training the (k−1)-th trained obfuscation network such that the (1_k)-th losses are minimized and such that one or more (2_k)-th losses calculated by referring to the original data and the k-th obfuscated data are maximized, and thus allowing the (k−1)-th trained obfuscation network to be a k-th trained obfuscation network.

13. The 1st learning device of claim 10, wherein, at the process of (III), when one or more obfuscated data scores have been acquired as the 2nd losses wherein the obfuscated data scores correspond to the obfuscated data inputted into a discriminator capable of determining whether data inputted thereto is real or fake, the processor performs or supports another device to perform (i) a process of training the obfuscation network such that the 1st losses are minimized and such that the 2nd losses are maximized, and
(ii) a process of training the discriminator such that one or more modified data scores or one or more modified obfuscated data scores, respectively corresponding to modified data or modified obfuscated data inputted into the discriminator, are maximized and such that the obfuscated data scores are minimized, wherein the modified data or the modified obfuscated data is generated by respectively modifying the original data or the obfuscated data.

14. The 1st learning device of claim 13, wherein the surrogate network includes a 1st surrogate network to an n-th surrogate network wherein n is an integer greater than 2, wherein, at the process of (II), the processor performs or supports another device to perform a process of allowing the obfuscated data and the ground truth to be transmitted to the 2nd learning device, to thereby allow the 2nd learning device to
(i) input the obfuscated data respectively into the 1st surrogate network to the n-th surrogate network, and thus instruct the 1st surrogate network to the n-th surrogate network to respectively generate 1st characteristic information to n-th characteristic information by applying corresponding learning operation of the 1st surrogate network to the n-th surrogate network to the obfuscated data,
(ii) calculate
(ii-1) one or more (1_1)-st losses by referring to the ground truth and at least one of the 1st characteristic information and a 1st task specific output created by using the 1st characteristic information to
(ii-2) one or more (1_n)-th losses by referring to the ground truth and at least one of the n-th characteristic information and an n-th task specific output created by using the n-th characteristic information,
(iii) train the 1st surrogate network to the n-th surrogate network respectively such that
(iii-1) the (1_1)-st losses to the (1_n)-th losses are respectively minimized or
(iii-2) at least one average loss, which is averaged over the (1_1)-st losses to the (1_n)-th losses, is minimized, and
(iv) transmit to the 1st learning device
(iv-1) at least part of the (1_1)-st losses to the (1_n)-th losses as the 1st losses or
(iv-2) the average loss as the 1st losses, and
wherein, at the process of (III), the processor performs or supports another device to perform
(i) one of
(i-1) a process of training the obfuscation network such that at least part of the (1_1)-st losses to the (1_n)-th losses are minimized and such that the 2nd losses, which are the obfuscated data scores corresponding to the obfuscated data inputted into the discriminator, are maximized, and
(i-2) a process of training the obfuscation network such that the average loss is minimized and such that the 2nd losses are maximized, and
(ii) a process of training the discriminator such that the modified data scores or the modified obfuscated data scores, respectively corresponding to the modified data or the modified obfuscated data inputted into the discriminator, are maximized, and such that the obfuscated data scores are minimized.

15. The 1st learning device of claim 13, wherein the surrogate network includes a 1st surrogate network to an n-th surrogate network wherein n is an integer greater than 2, wherein, at the process of (I), the processor performs or supports another device to perform a process of inputting the original data into the obfuscation network, to thereby allow the obfuscation network to obfuscate the original data and thus to generate obfuscated data, wherein, at the process of (II), the processor allows the 1st obfuscated data and the ground truth to be transmitted to the 2nd learning device, to thereby allow the 2nd learning device to
(i) input the 1st obfuscated data into the 1st surrogate network, and thus instruct the 1st surrogate network to generate 1st characteristic information by applying at least one learning operation of the 1st surrogate network to the 1st obfuscated data,
(ii) calculate one or more (1_1)-st losses by referring to the ground truth and at least one of the 1st characteristic information and a 1st task specific output created by using the 1st characteristic information,
(iii) train the 1st surrogate network such that the (1_1)-st losses are minimized, and
(iv) transmit the (1_1)-st losses to the 1st learning device, wherein, at the process of (III), the processor performs or supports another device to perform
(i) a process of training the obfuscation network such that the (1_1)-st losses are minimized and such that one or more (2_1)-st losses, which are one or more 1st obfuscated data scores corresponding to the 1st obfuscated data inputted into the discriminator, are maximized, to thereby allow the obfuscation network to be a 1st trained obfuscation network, and
(ii) a process of training the discriminator such that one or more 1st modified data scores or one or more 1st modified obfuscated data scores, respectively corresponding to the modified data or 1st modified obfuscated data created by modifying the 1st obfuscated data, inputted into the discriminator are maximized and such that the 1st obfuscated data scores are minimized, to thereby allow the discriminator to be a 1st trained discriminator, and wherein, while increasing an integer k from 2 to n, the processor performs or supports another device to perform
(I) a process of inputting the original data into a (k−1)-th trained obfuscation network, to thereby allow the (k−1)-th trained obfuscation network to generate k-th obfuscated data by obfuscating the original data,
(II) a process of allowing the k-th obfuscated data to be transmitted to the 2nd learning device, to thereby allow the 2nd learning device to
(i) input the k-th obfuscated data into a k-th surrogate network, and thus instruct the k-th surrogate network to generate k-th characteristic information by applying the learning operation of the k-th surrogate network to the k-th obfuscated data,
(ii) calculate one or more (1_k)-th losses by referring to the ground truth and at least one of the k-th characteristic information and a k-th task specific output created via using the k-th characteristic information, and (iii) train the k-th surrogate network such that the (1_k)-th losses are minimized, and transmit the (1_k)-th losses to the 1st learning device, and
(III)
(III-1) a process of training the (k−1)-th trained obfuscation network such that the (1_k)-th losses are minimized and such that one or more (2_k)-th losses, which are one or more k-th obfuscated data scores corresponding to the k-th obfuscated data inputted into a (k−1)-th trained discriminator, data are maximized, and thus allowing the (k−1)-th trained obfuscation network to be a k-th trained obfuscation network,
(III-2) a process of training the (k−1)-th trained discriminator such that one or more k-th modified data scores or one or more k-th modified obfuscated data scores, respectively corresponding to the modified data or k-th modified obfuscated data created by modifying the k-th obfuscated data inputted into the (k−1)-th trained discriminator and such that the k-th obfuscated data scores are minimized, to thereby allow the (k−1)-th trained discriminator to be a k-th trained discriminator.

16. The 1st learning device of claim 13, wherein a maximum of the modified data scores or the modified obfuscated data scores, respectively corresponding to the modified data or the modified obfuscated data inputted into the discriminator, is 1 as a value for determining the modified data or the modified obfuscated data as real, and a minimum of the obfuscated data scores, corresponding to the obfuscated data inputted into the discriminator, is 0 as a value for determining the obfuscated data as fake.

17. The 1st learning device of claim 10, wherein, at the process of (III), the processor
(i) measures at least one quality by referring to at least part of an entropy and a degree of noise of the obfuscated data, and
(ii) trains the obfuscation network such that the 1st losses are minimized by further referring to the measured quality.

18. A testing device for testing an obfuscation network, comprising:
at least one memory that stores instructions; and
at least one processor configured to execute the instructions to perform or support another device to perform:
(I) when a 1st learning device has performed or supported another device to perform
(i) a process of inputting original data for training of a 1st party into the obfuscation network, to thereby allow the obfuscation network to generate obfuscated data for training by obfuscating the original data for training, wherein the 1st party corresponds to the 1st learning device and wherein the 1st party is a party who is determined as an owner of the original data for training and its corresponding ground truth or is an entity to whom the original data for training and its corresponding ground truth are delegated by the owner,
(ii) a process of allowing the obfuscated data for training and the ground truth to be transmitted to a 2nd learning device corresponding to a 2nd party wherein the 2nd party is a party who is configured to train a surrogate network by using the original data for training and the ground truth of the 1st party, to thereby allow the 2nd learning device to
(ii-1) input the obfuscated data for training into the surrogate network, and thus instruct the surrogate network to generate characteristic information for training by applying at least one learning operation of the surrogate network to the obfuscated data for training,
(ii-2) calculate one or more 1st losses by referring to the ground truth and at least one of the characteristic information for training and a task specific output for training created by using the characteristic information for training,
(ii-3) train the surrogate network such that the 1st losses are minimized, and
(ii-4) transmit the 1st losses to the 1st learning device, and
(iii) when the 1st losses are acquired from the 2nd learning device, a process of training the obfuscation network such that the 1st losses are minimized and such that one or more 2nd losses calculated by referring to the original data for training and the obfuscated data for training are maximized, a process of acquiring original data for testing to be concealed, and (II) a process of the original data for testing into the obfuscation network, to thereby allow the obfuscation network to generate obfuscated data for testing by obfuscating the original data for testing.

19. The testing device of claim 18, wherein, at the process of (I), when one or more obfuscated data scores for training have been acquired as the 2nd losses wherein the obfuscated data scores for training correspond to the obfuscated data for training inputted into a discriminator capable of determining whether data inputted thereto is real or fake, the 1st learning device has completed or supported another device to complete
  (i) a process of training the obfuscation network such that the 1st losses are minimized and such that the 2nd losses are maximized, and
  (ii) a process of training the discriminator such that one or more modified data scores for training or one or more modified obfuscated data scores for training, respectively corresponding to modified data for training or modified obfuscated data for training inputted into the discriminator, are maximized and such that the obfuscated data scores are minimized, wherein the modified data for training or the modified obfuscated data for training is generated by respectively modifying the original data for training or the obfuscated data for training.

* * * * *